(12) United States Patent
Chen

(10) Patent No.: US 12,192,097 B2
(45) Date of Patent: *Jan. 7, 2025

(54) SYSTEM AND METHODS FOR COMPUTING FLOODING TOPOLOGY

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,747

(22) Filed: Nov. 27, 2023

(65) Prior Publication Data

US 2024/0223497 A1 Jul. 4, 2024

Related U.S. Application Data

(63) Continuation of application No. 17/569,177, filed on Jan. 5, 2022, now Pat. No. 11,855,883, which is a
(Continued)

(51) Int. Cl.
*H04L 45/00* (2022.01)
*H04L 45/02* (2022.01)
(Continued)

(52) U.S. Cl.
CPC ............. *H04L 45/32* (2013.01); *H04L 45/02* (2013.01); *H04L 45/42* (2013.01); *H04L 47/6275* (2013.01)

(58) Field of Classification Search
CPC ......... H04L 45/02; H04L 45/32; H04L 45/12; H04L 45/03; H04L 1/0013; H04L 1/1621;
(Continued)

(56) References Cited

U.S. PATENT DOCUMENTS

| | | | |
|---|---|---|---|
| 9,559,946 B2 * | 1/2017 | Arumugam | H04L 41/342 |
| 9,699,590 B2 * | 7/2017 | Inao | H04W 40/24 |

(Continued)

FOREIGN PATENT DOCUMENTS

| | | |
|---|---|---|
| CN | 1929443 A | 3/2007 |
| CN | 102387065 A | 3/2012 |

(Continued)

OTHER PUBLICATIONS

Zhao Xinhui et al., "Nonstructural P2P Model Based on Interest Domain", Computer & Digital Engineering, vol. 39 No. 9, Feb. 28, 2011, 4 pages.

(Continued)

*Primary Examiner* — Djenane M Bayard
(74) *Attorney, Agent, or Firm* — Conley Rose, P.C.

(57) ABSTRACT

Methods of computing a flooding topology (FT) for a network are presented. The methods include a process for computing a FT that includes all nodes in the network and a process for ensuring that all nodes in the FT have at least two links in the FT. Some of the methods minimize a number of links of the nodes in the FT. Some of the methods also constrain some of the nodes in the FT to a maximum number of links. Some of the methods compute a first FT for nodes whose maximum number of links in the FT equal their number of links in the network, then compute a second FT for remaining nodes in the network, then combines the two FTs to compute a complete FT for the network.

26 Claims, 37 Drawing Sheets

Related U.S. Application Data continuation of application No. PCT/US2020/040613, filed on Jul. 2, 2020.

(60) Provisional application No. 62/870,893, filed on Jul. 5, 2019.

(51) Int. Cl.
*H04L 45/42* (2022.01)
*H04L 47/6275* (2022.01)

(58) Field of Classification Search
CPC ... H04L 2001/0093; H04L 1/08; H04L 45/48; H04L 45/28; H04L 45/44; H04L 45/488; H04L 45/123; H04L 47/12; H04L 41/0893; H04L 45/00; H04L 12/18; H04L 12/1854; H04L 12/66; H04L 41/12; H04L 41/14; H04L 43/0811; H04L 45/122; H04L 45/46; H04L 45/50; H04L 45/021; H04L 45/033; H04L 45/04; H04L 67/1095; H04L 12/4625; H04L 12/4641; H04L 41/122; H04L 41/145; H04L 41/22; H04L 43/20; H04L 43/50; H04L 47/83; H04L 43/08; H04L 67/51; H04L 67/10; H04L 43/10; H04L 41/0816; H04L 43/04; H04L 45/127; H04L 67/60; H04L 47/70; H04L 41/509; H04L 67/01; H04L 41/0869; H04L 41/0813; H04L 41/0823; H04L 41/0896; H04L 67/568; H04L 41/50; H04L 41/5041; H04L 67/289
See application file for complete search history.

(56) References Cited

U.S. PATENT DOCUMENTS

| | | | |
|---|---|---|---|
| 2008/0259784 A1 | 10/2008 | Allan et al. | |
| 2011/0026437 A1 | 2/2011 | Roja-Cessa et al. | |
| 2011/0090787 A1 | 4/2011 | Smith et al. | |
| 2012/0044947 A1 | 2/2012 | Ward et al. | |
| 2016/0198666 A1* | 7/2016 | Just | A01H 6/822 800/300 |
| 2016/0226735 A1* | 8/2016 | Tulino | H04L 67/00 |
| 2016/0337233 A1 | 11/2016 | Lu et al. | |
| 2016/0344207 A1* | 11/2016 | Bulur | H02J 7/0014 |
| 2018/0115481 A1 | 4/2018 | White et al. | |
| 2019/0312805 A1 | 10/2019 | Li | |
| 2021/0119910 A1 | 4/2021 | Chen et al. | |

FOREIGN PATENT DOCUMENTS

| | | |
|---|---|---|
| CN | 104796339 A | 7/2015 |
| CN | 108463976 A | 8/2018 |

OTHER PUBLICATIONS

Allen "A Distributed Algorithm for Constrained Flooding of IGP Advertisements," draft-allan-lsr-flooding-algorithm-00, Oct. 2018, 13 pages.
Bradner, "Key Words for Use in RFCs to Indicate Requirement Levels," RFC 2119, Mar. 1997, 3 pages.
Callon, "Use of OSI IS-IS for Routing in TCP/IP and Dual Environments," RFC 1195, Dec. 1990, 68 pages.
Chen, et al., "Flooding Topology Computation Algorithm," draft-ietf-lsr-flooding-reduction-04, Jul. 7, 2019, 9 pages.
Chen, et al., "Flooding Topology Minimum Degree Algorithm," draft-ietf-lsr-flooding-topo-min-degree-04, Dec. 31, 2021, 12 pages.
Chen, et al., "LS Distributed Flooding Reduction," draft-cc-lsr-flooding-reduction-03, Mar. 11, 2019, 24 pages.
Cotton, et al., "Guidelines for Writing an IANA Considerations Section in RFCs," RFC 8126, Jun. 2017, 47 pages.
Li, et al., "Dynamic Flooding on Dense Graphs," draft-ietf-lsr-dynamic-flooding-03, Jun. 4, 2019, 47 pages.
Litowski, et al., "Link State Protocols SPF Trigger and Delay Algorithm Impact on IGP Micro-loops," draft-ietf-rtgwg-spf-uloop-pb-statement-10, Jan. 2019, 15 pages.
Moy, "OSPF Version," RFC 2328, Apr. 1998, 244 pages.
H. Chen, et al., "Flooding Topology Computation Algorithm," draft-cc-lsr-flooding-reduction-04, Jul. 7, 2019, 9 pages.
H. Chen, et al., "LS Distributed Flooding Reduction," draft-cc-lsr-flooding-reduction-03, Mar. 11, 2019, 47 pages.
T. Li Ed., et al., "Dynamic Flooding on Dense Graphs," draft-ietf-lsr-dynamic-flooding-03, Jun. 4, 2019, 93 pages.

* cited by examiner

Cq = {(R2,0,R0), (R3,0,R0), (R9,0,R1)}

FT = {(R0,2,null), (R1,1,R0), (R2,1,R0)}

Cq' = {(R3,0,R0), (R9,0,R1), (R4,0,R2), (R5,0,R2)}

Cq = {(R8,0,R9)}

FT = {(R0,3,null), (R1,2,R0), (R2,3,R0), (R3,3,R0), (R9,2,R1), (R4,1,R2), (R5,1,R2), (R6,1,R3), (R7,1,R3), (R8,1,R9)}

Cq' = { }

FT = {(R0,3,null), (R1,2,R0), (R2,3,R0), (R3,3,R0), (R9,2,R1), (R4,2,R2), (R5,2,R2), (R6,1,R3), (R7,1,R3), (R8,1,R9), (R4,2,R5)}

FT' = {(R0,3,null), (R1,2,R0), (R2,3,R0), (R3,3,R0), (R9,2,R1), (R4,2,R2), (R5,2,R2), (R6,2,R3), (R7,2,R3), (R8,1,R9), (R4,2,R5), (R6,2,R7)}

FT = {(R0,3,null), (R1,2,R0), (R2,3,R0), (R3,3,R0), (R9,2,R1), (R4,2,R2), (R5,2,R2), (R6,2,R3), (R7,2,R3), (R8,1,R9), (R4,2,R5), (R6,2,R7)}

FT' = {(R0,3,null), (R1,2,R0), (R2,3,R0), (R3,3,R0), (R9,2,R1), (R4,3,R2), (R5,2,R2), (R6,2,R3), (R7,2,R3), (R8,2,R9), (R4,2,R5), (R6,2,R7), (R8,2,R4)}

230

FT = {(R0,3,null), (R1,2,R0), (R2,3,R0), (R3,3,R0), (R9,2,R1), (R4,3,R2), (R5,2,R2), (R6,2,R3), (R7,2,R3), (R8,2,R9), (R4,2,R5), (R6,2,R7), (R8,2,R4)}

FT = { (R0,3,{ }), (R1,2,{R0}), (R2,2,{R0, R3}), (R3,2,{R0}), (R4,1,{R1}) }

FT' = { (R0,3,{ }), (R1,2,{R0}), (R2,3,{R0, R3}), (R3,2,{R0}), (R4,2,{R1, R2}) }

MaxD = 3

Cq = { ~~(R3,0, {R0})~~, (R4,0,{R0}), (R5,0, {R0}), (R1,0,{R2}), (R6,0,{R2}), (R7,0,{R2}), (R8,0,{R2}), (R9,0,{R2}), (R10,0,{R2}) }

FT = { (R0,2, { }), (R2,1, {R0}), (R3,1, {R0}) }

Cq' = { (R4,0,{R0}), (R5,0, {R0}), (R1,0,{R2,R3}), (R6,0,{R2,R3}), (R7,0,{R2,R3}), (R8,0,{R2,R3}), (R9,0,{R2,R3}), (R10,0,{R2,R3}) }

MaxD = 3

Cq = { ~~(R10,0,{R2,R3,R4,R5})~~ }

FT = { (R0,3, { }), (R2,3, {R0}), (R3,3, {R0}), (R4,3, {R0}), (R1,2, {R2}), (R5,1, {R1}), (R6,1, {R2}), (R7,1, {R3}), (R8,1,{R3}), (R9,1, {R4}), (R10,1,{R4}) }

Cq' = { }

MaxD = 4

FT = { (R0,4, { }), (R2,4, {R0}), (R3,4, {R0}), (R4,4, {R0}),
(R5,3, {R0, R6}), (R1,2, {R2,R4}), (R6,2, {R2}), (R7,2, {R2, R4}),
(R8,2, {R3, R5}), (R9,2, {R3, R4}), (R10,1, {R3}) }

FT' = { (R0,4, { }), (R2,4, {R0}), (R3,4, {R0}), (R4,4, {R0}),
(R5,4, {R0, R6}), (R1,2, {R2,R4}), (R6,2, {R2}), (R7,2, {R2, R4}),
(R8,2, {R3, R5}), (R9,2, {R3, R4}), (R10,2, {R3, R5}) }

1120

MaxD = 5

FT1 = { (R0,3,{ }), (R1,1,{R0}), (R2,4,{R0}), (R3,4,{R0}) }

FT1' = { (R0,3,{ }), (R1,2,{R0, R2}), (R2,5,{R0}), (R3,4,{R0}) }

1130

MaxD = 5

FT = { (R0,3,{ }), (R1,2,{R0, R2}), (R2,5,{R0}), (R3,4,{R0}) }

SYSTEM AND METHODS FOR COMPUTING FLOODING TOPOLOGY

CROSS-REFERENCE TO RELATED APPLICATIONS

This patent application is a continuation of U.S. patent application Ser. No. 17/569,177 filed on Jan. 5, 2022 by Futurewei Technologies, Inc., and titled "System and Methods for Computing Flooding Topology," which is a continuation of International Application No. PCT/US2020/040613 filed on Jul. 2, 2020 by Futurewei Technologies, Inc., and titled "System and Methods for Computing Flooding Topology," which claims the benefit of U.S. provisional patent application No. 62/870,893, filed Jul. 5, 2019, by Huaimo Chen, and titled "System and Method for Computing Flooding Topology," which is incorporated by reference.

TECHNICAL FIELD

The present application relates to network communication, and more specifically to a system and methods for computing a flooding topology.

BACKGROUND

A routing protocol specifies how routers communicate with each other, distributing information that enables them to select routes between any two nodes on a computer network. An interior gateway protocol (IGP) is a type of protocol used for exchanging routing information between gateways (commonly routers) within an autonomous system (AS). This routing information can then be used to route network-layer protocols like Internet Protocol (IP) packets. An AS is a collection of connected IP routing prefixes under the control of one or more network operators on behalf of a single administrative entity or domain that presents a common, clearly defined routing policy to the internet (for example, a system of corporate local area networks).

Within IGP, there are different types. Type 1 IGP is referred to as a link-state routing protocol. The link-state routing protocol is performed by every switching node in the network (i.e., nodes that are prepared to forward packets; in the Internet, these are called routers). The basic concept of link-state routing is that every node constructs a map of the connectivity to the network, in the form of a graph, showing which nodes are connected to which other nodes. Each node then independently calculates the best logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS or ISIS).

OSPF is a standard routing protocol designated by the Internet Engineering Task Force (IETF). OSPF uses Link State Advertisement (LSA) to exchange routing information between routers. Each router within an area will flood a type 1 LSA (also called router LSA) within the area. LSA's are encapsulated behind an OPSF packet and then an IP packet. An area is a logical group of OSPF-based networks, routers, and links that have the same area number. Routers that belong to the same area keep a topological database for the entire area. The router LSA contains information about directly connected links in the area to which the router belongs (e.g., a list with all the directly connected links of the advertising router). This list is flooded to all routers in that area. If the router is an ABR (Area Border Router), it generates type 1 LSAs for all the areas to which it is connected and sends those LSAs to all neighbors in corresponding areas.

IS-IS is a routing protocol standardized by the International Standards Organization (ISO). IS-IS uses Link State Protocol Data Unit (LSP) to exchange routing information between routers. LSP is a packet of information generated by a network router in a link state routing protocol that lists the router's neighbors. A LSP packet can also be further defined as special datagrams that determine the names of, and the cost or distance to, any neighboring routers and associated networks. They are used to efficiently determine what the new neighbor is, if a link failure occurs, and the cost of changing a link if the need arises.

Some additional differences between OSPF and IS-IS are that OSPF supports non-broadcast multiple access network (NBMA) and point-to-multipoint links, whereas IS-IS does not; IS-IS runs on the data link layer (L2), whereas OSPF runs on the network layer (L3); and OSPF supports virtual link, whereas IS-IS does not.

Irrespective of which IGP routing protocol is used, as a network becomes bigger and bigger, IGP routing convergence becomes slower when a change such as a link failure occurs in the network. IGP convergence occurs when all components of every router in the network, including the Routing Information Base (RIB) and Forwarding Information Base (FIB), along with software and hardware tables, are provided with the most recent route change(s) such that forwarding for a route entry is successful on the Best Egress (or 'next hop') Interface.

The links between nodes in a network are described in a network topology (NT) that is stored in a link state database (LSDB) of a router. Every router in a network has a LSDB, which represents the network topology of the area to which the router belongs. The algorithm running on each router will use the network topology in the LSDB of the router.

One or multiple failures may split the flooding topology (FT) even though the underlying (physical) topology is not split. Computing and building a new FT, and flooding the new FT from the leader node to every node in the network takes time. During this time, link-state databases (LSDBs) may be out of synchronization and network convergence is slowed down.

SUMMARY

A first aspect relates to a method for computing a flooding topology (FT) in a network device. The method includes selecting a node R0 from a network; initializing the FT with the node R0; initializing a candidate queue (Cq); and implementing a first loop of the method. The first loop of the method includes removing a first node from the Cq and adding the first node to the FT; determining whether the FT includes all nodes in the network; terminating the first loop when the FT includes all the nodes in the network; and appending to the Cq nodes that are coupled in the network to the first node and are not in the FT when the FT does not include all the nodes in the network. The method further includes adding a link to any node in the FT having only one link in the FT.

Optionally, in any of the preceding aspects, another implementation of the aspect provides that the first loop of the method further includes determining whether the Cq is empty when the FT does not include all the nodes in the network; and when the Cq is empty: transmitting a first message to an administrator of the network; transmitting a second message to a component in the network device, the first and second messages indicating an existence of nodes in the network that are unconnected to other nodes of the network; and terminating the method of claim 1.

Optionally, in any of the preceding aspects, another implementation of the aspect provides that adding the link to any node in the FT having only one link in the FT includes implementing a second loop of the method. The second loop of the method includes determining whether the FT includes a node Q having only one link in the FT; terminating the second loop with all the nodes in the FT having more than one link in the FT when the FT does not include the node Q; and when the FT does include the node Q: creating a set of all nodes that are coupled in the network to the node Q; selecting a node L in the set, the node L having (i) a lowest number of links in the FT, and (ii) a lowest nodeID when two or more nodes have the same lowest number of links in the FT; incrementing by 1 a degree of the node Q in the FT; incrementing by 1 the degree of the node L in the FT; and adding a link between Q and L to the FT.

Optionally, in any of the preceding aspects, another implementation of the aspect provides that the node R0 has a lowest nodeID in the network.

Optionally, in any of the preceding aspects, another implementation of the aspect provides that the Cq is initialized with nodes ordered from lowest nodeID to highest nodeID.

Optionally, in any of the preceding aspects, another implementation of the aspect provides that nodes appended to the Cq are ordered from lowest nodeID to highest nodeID.

A second aspect relates to a method for computing a flooding topology (FT) in a network device. The method includes setting an initial value for a maximum degree (MaxD); and implementing a first loop of the method. The first loop of the method includes selecting a node R0 from a network; initializing the FT with the node R0; adding nodes from the network to the FT; determining whether the FT includes all nodes in the network; and incrementing the value of the MaxD and repeating the steps of the first loop until the FT includes all the nodes in the network. The method further includes implementing a second loop of the method when the FT includes all the nodes in the network. The second loop of the method includes adding a link to any node in the FT having only one link in the FT and coupled in the network to a node having a number of links less than MaxD; determining whether all the nodes in the FT have more than one link in the FT; and incrementing the value of the MaxD and repeating the first loop and the second loop until all the nodes in the FT have more than one link in the FT.

Optionally, in any of the preceding aspects, another implementation of the aspect provides that adding the nodes from the network to the FT includes initializing a candidate queue (Cq) to include all nodes that are coupled in the network to the node R0, the nodes being ordered in the Cq by a nodeID of each node; and implementing a third loop of the method. The third loop of the method includes determining whether the Cq includes a node X, the node X being a first node in the Cq having a node Y in a Previous Hops (PHs) of the node X, the node Y having a degree less than MaxD; terminating the third loop with the FT not including all the nodes in the network when the Cq does not include the node X; removing the node X from the Cq and adding the node X to the FT; determining whether the FT includes all the nodes in the network; modifying the Cq when the FT does not include all the nodes in the network; and terminating the third loop when the FT includes all the nodes in the network.

Optionally, in any of the preceding aspects, another implementation of the aspect provides that modifying the Cq when the FT does not include all the nodes in the network includes creating a queue of all nodes that are coupled in the network to the node X and are not in the FT, the queue ordered by the nodeID of the nodes in the queue; and for each node Z in the queue: determining whether the node Z is in the Cq; adding the node X to the PHs of the node Z in the Cq when the node Z is in the Cq; and appending the node Z to the Cq when the node Z is not in the Cq.

Optionally, in any of the preceding aspects, another implementation of the aspect provides that adding the link to any node in the FT having only one link in the FT and coupled in the network to the node having a number of links less than MaxD includes implementing a fourth loop of the method. The fourth loop of the method includes determining whether the FT includes a node Q having only one link in the FT; terminating the fourth loop with all the nodes in the FT having more than one link in the FT when the FT does not include the node Q; determining whether the FT includes a node L coupled to Q in the network, the node L having (i) a lowest number of links in the FT, (ii) a lowest nodeID when two or more nodes have the same lowest number of links in the FT, and (iii) the degree less than MaxD, when the FT does include the node Q; when the FT does include the node L: incrementing by 1 the degree of the node Q in the FT; incrementing by 1 the degree of the node L in the FT; and adding the node L to the PHs of the node Q in the FT; and terminating the fourth loop without all the nodes in the FT having more than one link in the FT when the FT does not include the node L.

Optionally, in any of the preceding aspects, another implementation of the aspect provides that the node R0 has a lowest nodeID in the network.

Optionally, in any of the preceding aspects, another implementation of the aspect provides that the Cq is initialized with nodes ordered from lowest nodeID to highest nodeID.

Optionally, in any of the preceding aspects, another implementation of the aspect provides that nodes appended to the Cq are ordered from lowest nodeID to highest nodeID.

A third aspect relates to a method for computing a flooding topology (FT) in a network device. The method includes setting an initial value for a maximum degree (MaxD), the initial value equal to a stored value for MaxD from a previous computed FT for a network; and implementing a first loop of the method. The first loop of the method includes selecting a node R0 from the network; initializing the FT with the node R0; adding nodes from the network to the FT; determining whether the FT includes all the nodes in the network; adding a link to any node in the FT having only one link in the FT and coupled in the network to a node having a number of links less than MaxD when the FT includes all the nodes in the network; determining whether (i) the FT includes all the nodes in the network and (ii) all the nodes in the FT have more than one link in the FT; storing the value of MaxD as a successful MaxD and storing the FT as a successful FT when (i) the FT includes all the nodes in the network and (ii) all the nodes in the FT have more than one link in the FT; and decrementing the value of the MaxD and repeating the first loop until (i) the FT does not include all the nodes in the network or (ii) fewer than all the nodes in the FT have more than one link in the FT. The method further includes setting the MaxD to the stored value of the successful MaxD; and setting the FT to the stored successful FT.

Optionally, in any of the preceding aspects, another implementation of the aspect provides that adding the nodes from the network to the FT includes initializing a candidate queue (Cq) to include all nodes that are coupled in the network to the node R0, the nodes being ordered in the Cq by a nodeID of each node; and implementing a second loop of the method. The second loop of the method includes determining whether the Cq includes a node X, the node X being a first node in the Cq having a node Y in a Previous Hops (PHs) of the node X, the node Y having a degree less than MaxD; terminating the second loop with the FT not including all the nodes in the network when the Cq does not include the node X; removing the node X from the Cq and adding the node X to the FT; determining whether the FT includes all the nodes in the network; modifying the Cq when the FT does not include all the nodes in the network; and terminating the second loop when the FT includes all the nodes in the network.

Optionally, in any of the preceding aspects, another implementation of the aspect provides that modifying the Cq when the FT does not include all the nodes in the network includes creating a queue of all nodes that are coupled in the network to the node X and are not in the FT, the queue ordered by the nodeID of the nodes in the queue; and for each node Z in the queue: determining whether the node Z is in the Cq; adding the node X to the PHs of the node Z in the Cq when the node Z is in the Cq; and appending the node Z to the Cq when the node Z is not in the Cq.

Optionally, in any of the preceding aspects, another implementation of the aspect provides that adding a link to any node in the FT having only one link in the FT and coupled in the network to a node having a number of links less than MaxD includes implementing a third loop of the method. The third loop of the method includes determining whether the FT includes a node Q having only one link in the FT; terminating the third loop with all the nodes in the FT having more than one link in the FT when the FT does not include the node Q; determining whether the FT includes a node L coupled to Q in the network, the node L having (i) a lowest number of links in the FT, (ii) a lowest nodeID when two or more nodes have the same lowest number of links in the FT, and (iii) the degree less than MaxD, when the FT does include the node Q; when the FT does include the node L: incrementing by 1 the degree of the node Q in the FT; incrementing by 1 the degree of the node L in the FT; and adding the node L to the PHs of the node Q in the FT; and terminating the third loop without all the nodes in the FT having more than one link in the FT when the FT does not include the node L.

Optionally, in any of the preceding aspects, another implementation of the aspect provides that the node R0 has a lowest nodeID in the network.

Optionally, in any of the preceding aspects, another implementation of the aspect provides that the Cq is initialized with nodes ordered from lowest nodeID to highest nodeID.

Optionally, in any of the preceding aspects, another implementation of the aspect provides that nodes appended to the Cq are ordered from lowest nodeID to highest nodeID.

A fourth aspect relates to a method for computing a flooding topology (FT) in a network device. The method includes setting an initial value for a maximum degree (MaxD); and implementing a first loop of the method. The first loop of the method includes selecting a node R0 from a network; initializing the FT with the node R0; adding nodes from the network to the FT; determining whether the FT includes all the nodes in the network; and incrementing the value of the MaxD and repeating the steps of the first loop until the FT includes all the nodes in the network. The method further includes implementing a second loop of the method when the FT includes all the nodes in the network. The second loop of the method includes adding a link to any node in the FT having only one link in the FT; determining whether all the nodes in the FT have more than one link in the FT; and terminating the second loop when all the nodes in the FT have more than one link in the FT. The method further includes finding a node M in the FT having a largest number of links in the FT; and setting the value of the MaxD to the number of links in the FT of the node M.

Optionally, in any of the preceding aspects, another implementation of the aspect provides that adding the nodes from the network to the FT includes initializing a candidate queue (Cq) to include all nodes that are coupled in the network to the node R0, the nodes being ordered in the Cq by a nodeID of each node; and implementing a third loop of the method. The third loop of the method includes determining whether the Cq includes a node X, the node X being a first node in the Cq having a node Y in a Previous Hops (PHs) of the node X, the node Y having a degree less than MaxD; terminating the third loop with the FT not including all the nodes in the network when the Cq does not include the node X; removing the node X from the Cq and adding the node X to the FT; determining whether the FT includes all the nodes in the network; modifying the Cq when the FT does not include all the nodes in the network; and terminating the third loop when the FT includes all the nodes in the network.

Optionally, in any of the preceding aspects, another implementation of the aspect provides that modifying the Cq when the FT does not include all the nodes in the network includes creating a queue of all nodes that are coupled in the network to the node X and are not in the FT, the queue ordered by the nodeID of the nodes in the queue; for each node Z in the queue: determining whether the node Z is in the Cq; adding the node X to the PHs of the node Z in the Cq when the node Z is in the Cq; and appending the node Z to the Cq when the node Z is not in the Cq.

Optionally, in any of the preceding aspects, another implementation of the aspect provides that adding the link to any node in the FT having only one link in the FT includes implementing a fourth loop of the method. The fourth loop of the method includes determining whether the FT includes a node Q having only one link in the FT; terminating the fourth loop with all the nodes in the FT having more than one link in the FT when the FT does not include the node Q; determining whether the FT includes a node L coupled to Q in the network, the node L having (i) a lowest number of links in the FT and (ii) a lowest nodeID when two or more nodes have the same lowest number of links in the FT, when the FT does include the node Q; and when the FT does include the node L: incrementing by 1 the degree of the node Q in the FT; incrementing by 1 the degree of the node L in the FT; and adding the node L to the PHs of the node Q in the FT.

Optionally, in any of the preceding aspects, another implementation of the aspect provides that the node R0 has a lowest nodeID in the network.

Optionally, in any of the preceding aspects, another implementation of the aspect provides that the Cq is initialized with nodes ordered from lowest nodeID to highest nodeID.

Optionally, in any of the preceding aspects, another implementation of the aspect provides that nodes appended to the Cq are ordered from lowest nodeID to highest nodeID.

A fifth aspect relates to a method for computing a flooding topology (FT) in a network device. The method includes setting an initial value for a maximum degree (MaxD); obtaining information identifying a subset of nodes in a network having a constraint (ConMaxD) on a number of links in the FT of nodes in the subset of nodes; and implementing a first loop of the method. The first loop of the method includes selecting a node R0 from the network; initializing the FT with the node R0; adding nodes from the network to the FT; determining whether the FT includes all the nodes in the network; and incrementing the value of the MaxD and repeating the steps of the first loop until the FT includes all the nodes in the network. The method further includes implementing a second loop of the method when the FT includes all the nodes in the network. The second loop of the method includes adding a link to any node Q in the FT, the node Q having only one link in the FT and coupled in the network to a node L, the node L being a node in the subset of nodes having a number of links in the FT less than the ConMaxD or being a node not in the subset of nodes having a number of links in the FT less than the MaxD; determining whether all the nodes in the FT have more than one link in the FT; and incrementing the value of the MaxD and repeating the first loop and the second loop until all the nodes in the FT have more than one link in the FT.

Optionally, in any of the preceding aspects, another implementation of the aspect provides that adding the nodes from the network to the FT includes initializing a candidate queue (Cq) to include all nodes that are coupled in the network to the node R0, the nodes being ordered in the Cq by a nodeID of each node; and implementing a third loop of the method. The third loop of the method includes determining whether the Cq includes a node X, the node X being a first node in the Cq (i) having a node Y in a Previous Hops (PHs) of the node X, the node Y having a degree less than the ConMaxD, when the node X is a node in the subset of nodes, or (ii) having a node Y in a Previous Hops (PHs) of the node X, the node Y having a degree less than the MaxD, when the node X is a node not in the subset of nodes; terminating the third loop with the FT not including all the nodes in the network when the Cq does not include the node X; removing the node X from the Cq and adding the node X to the FT; and determining whether the FT includes all the nodes in the network; modifying the Cq when the FT does not include all the nodes in the network; and terminating the third loop when the FT includes all the nodes in the network.

Optionally, in any of the preceding aspects, another implementation of the aspect provides that modifying the Cq when the FT does not include all the nodes in the network includes creating a queue of all nodes that are coupled in the network to the node X and are not in the FT, the queue ordered by the nodeID of the nodes in the queue; and for each node Z in the queue: determining whether the node Z is in the Cq; adding the node X to the PHs of the node Z in the Cq when the node Z is in the Cq; and appending the node Z to the Cq when the node Z is not in the Cq.

Optionally, in any of the preceding aspects, another implementation of the aspect provides that adding a link to any node in the FT having only one link in the FT and coupled in the network to a node having a number of links less than MaxD includes implementing a fourth loop of the method. The fourth loop of the method includes determining whether the FT includes a node Q having only one link in the FT; terminating the fourth loop with all the nodes in the FT having more than one link in the FT when the FT does not include the node Q; determining whether the FT includes a node L coupled to Q in the network, the node L having (i) a lowest number of links in the FT, (ii) a lowest nodeID when two or more nodes have the same lowest number of links in the FT, and (iii) (a) having a degree less than the ConMaxD, when the node L is a node in the subset of nodes, or (b) having a degree less than the MaxD, when the node L is a node not in the subset of nodes, when the FT does include the node Q; when the FT does include the node L: incrementing by 1 the degree of the node Q in the FT; incrementing by 1 the degree of the node L in the FT; and adding the node L to the PHs of the node Q in the FT; and terminating the fourth loop without all the nodes in the FT having more than one link in the FT when the FT does not include the node L.

Optionally, in any of the preceding aspects, another implementation of the aspect provides that the node R0 has a lowest nodeID in the network.

Optionally, in any of the preceding aspects, another implementation of the aspect provides that the Cq is initialized with nodes ordered from lowest nodeID to highest nodeID.

Optionally, in any of the preceding aspects, another implementation of the aspect provides that nodes appended to the Cq are ordered from lowest nodeID to highest nodeID.

A sixth aspect relates to a method for computing a complete flooding topology (FT) in a network device. The method includes obtaining information identifying a subset of nodes in a network having a constraint (ConMaxD) on a number of links in the FT of nodes in the subset of nodes; computing a first flooding topology (FT0) that includes all deterministic nodes in the network, a deterministic node being a node in the subset having a number of links to other nodes in the network that is equal to ConMaxD; forming a network topology (NT1) that includes all nodes in the network that are not in the FT0; computing a second flooding topology (FT1) for the nodes in the NT1; and computing the complete FT by appending the FT0 to the FT1.

Optionally, in any of the preceding aspects, another implementation of the aspect provides that computing the FT0 that includes all the deterministic nodes in the network includes initializing a first candidate queue (Cq0) to include all nodes in the network; and implementing a first loop of the method. The first loop of the method includes determining whether the Cq0 includes a node X, the node X being a first node in the Cq0 that is a deterministic node; terminating the first loop when the Cq0 does not include a node X; when the Cq0 does include a node X: removing the node X from the Cq0; adding the node X to the FT0 with a degree equal to ConMaxD and a Previous Hops (PHs) containing nodes in the network to which X is linked in the network; and incrementing the degree in Cq0 for each of the nodes in the network to which X is linked in the network.

Optionally, in any of the preceding aspects, another implementation of the aspect provides that computing the FT1 for the nodes in the NT1 includes determining whether any node in the NT1 is in the subset of nodes; computing a minimized FT1 for the NT1 when no node in the NT1 is in the subset of nodes; and computing a constrained and minimized FT1 for the NT1 when a node in the NT1 is in the subset of nodes.

Optionally, in any of the preceding aspects, another implementation of the aspect provides that computing the minimized FT1 for the NT1 includes finding a node H in the Cq0 having a highest value of degree of the nodes in the Cq0; setting an initial value for a maximum degree (MaxD) equal to 1 plus the value of degree of the node H; and implementing a second loop of the method. The second loop of the method includes selecting a node R0 from the NT1; initializing the FT1 with the node R0; adding nodes from the network to the FT1 based on the MaxD; determining whether the FT1 includes all the nodes in the NT1; and incrementing the value of the MaxD and repeating the steps of the second loop until the FT1 includes all the nodes in the NT1. The method further includes implementing a third loop of the method when the FT1 includes all the nodes in the NT1. The third loop of the method includes adding a link to any node in the FT1 having only one link in the FT1 and coupled in the NT1 to a node having a number of links less than MaxD; determining whether all the nodes in the FT1 have more than one link in the FT1; and incrementing the value of the MaxD and repeating the second loop and the third loop until all the nodes in the FT1 have more than one link in the FT1.

Optionally, in any of the preceding aspects, another implementation of the aspect provides that computing the constrained and minimized FT1 for the NT1 includes finding a node H in the Cq0 having a highest value of degree of the nodes in the Cq0; setting an initial value for a maximum degree (MaxD) equal to 1 plus the value of degree of the node H; and implementing a fourth loop of the method. The fourth loop of the method includes selecting a node R0 from the NT1; initializing the FT1 with the node R0; adding nodes from the network to the FT1 based on the MaxD and the ConMaxD; determining whether the FT1 includes all the nodes in the NT1; and incrementing the value of the MaxD and repeating the steps of the second loop until the FT1 includes all the nodes in the NT1. The method further includes implementing a fifth loop of the method when the FT1 includes all the nodes in the NT1. The fifth loop of the method includes adding a link to any node Q in the FT1, the node Q having only one link in the FT1 and coupled in the network to a node L, the node L being a node in the subset of nodes having a number of links in the FT1 less than the ConMaxD or being a node not in the subset of nodes having a number of links in the FT1 less than the MaxD; determining whether all the nodes in the FT1 have more than one link in the FT1; and incrementing the value of the MaxD and repeating the first loop and the second loop until all the nodes in the FT1 have more than one link in the FT1.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
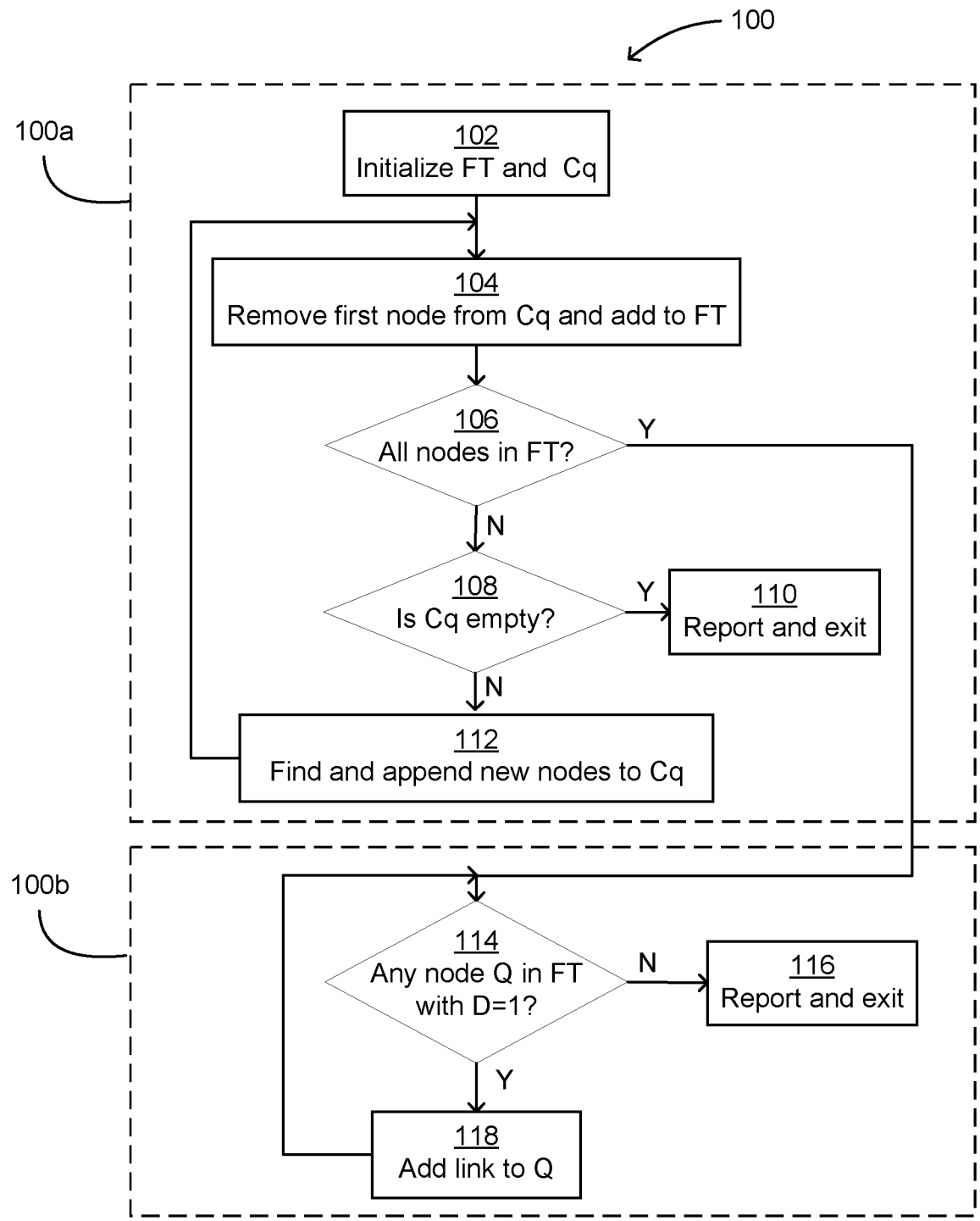
FIG. 1 presents a flow chart illustrating a first method according to an embodiment of the present disclosure for computing a flooding topology (FT).

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multiple flooding topologies may be constructed for a given Network Topology (NT). For example, a chain connecting all the nodes in the NT is a flooding topology. A circle connecting all the nodes is another flooding topology.

A tree connecting all the nodes is a flooding topology. In addition, the tree plus the connections between some leaves of the tree and branch nodes of the tree is a flooding topology.

A FT for a network is dynamic in nature: when the base topology of the nodes and links in the network (the entire topology graph) changes, the FT (which is a sub-graph of the NT) is re-computed (or re-constructed) to ensure that any node that is reachable on the new NT is also reachable on the re-computed FT.

For some networks such as dense Data Center (DC) networks, some Link State (LS) flooding mechanisms are inefficient and may have other shortcomings. Extra LS flooding caused by using such LS flooding mechanisms consumes network bandwidth. Processing the extra LS flooding, including receiving, buffering and decoding the extra LSs, wastes memory space and processor time. This may cause scalability issues and affect the network convergence negatively.

As stated above, during the process of computing and building a new FT, and flooding the new FT to every node in the network from the leader node, LSDBs may be out of synchronization, and network convergence is slowed down. The disclosed embodiments of the present disclosure seek to address the above issues by providing various systems and methods for simultaneous deterministic computation of a FT by multiple nodes of a network.

From the NT stored in the LSDB of a router, the disclosed embodiments of the present disclosure compute a FT. The FT is a subset of the links of the NT such that, reachability to all the nodes in the sub network is the same as in the real network, the degree of the FT is minimized, a number of links in the FT is minimized, and when one link fails in the FT, reachability to all the nodes in the FT remains the same as in the real network.

Several parameters may be considered in evaluating a FT:

Degree: The degree of a node on a FT is the number of connections the node has on the FT to other nodes. The degree of the FT is the maximum degree among the degrees of the nodes on the FT.

Number of links: The number of links on the FT is a factor in reducing the amount of LS flooding. In general, the smaller the number of links, the smaller the amount of LS flooding.

Diameter: The diameter of a FT is the shortest distance between the two most distant nodes on the FT. Diameter is a factor in reducing network convergence time. In general, the smaller the diameter, the shorter the convergence time.

Redundancy: Redundancy in a FT provides a tolerance to the failure of one or more links and/or nodes on the FT. If the FT is split by certain failures, it is considered not tolerant to these failures. In general, the larger the number of links on the FT, the more redundant the FT is and the more tolerant the FT is to failures.

In embodiments of the present disclosure, a process running on all the nodes computes the same FT quickly and the FT satisfies the above conditions. The present disclosure presents four such processes. By computing a flooding topology using the same process in every node in an area and flooding the link states using the computed FT, the amount of flooding traffic in the network is reduced. Such simultaneous computation reduces convergence time, resulting in a more stable and optimized routing environment.

FIG. 1 is a flow chart illustrating a first method 100 according to an embodiment of the present disclosure for computing a FT for a NT in a breadth-first process. The method 100 includes a first sub-process 100a for computing a FT that includes all the nodes in the network and a second sub-process 100b for ensuring that all nodes in the FT have at least two links in the FT.

The FT is represented in the method 100 by an ordered set of node descriptors (nodeID, D, PH), where nodeID is the ID of the node in the NT, D is the degree of the node in the FT, and PH is the nodeID of a Previous Hop node to which the node is linked in the FT. A set data structure containing the FT is referred to in the description of the method 100 as FT. The FT is built by adding and modifying node descriptors in the FT as the method 100 proceeds through iterations of the sub-processes 100a and 100b.

In step 102, the sub-process 100a of adding node descriptors to the FT begins by initializing the FT and a candidate queue (Cq). A root node R0 having the lowest nodeID in the network is selected, and the FT is initialized to the value {(R0, 0, null)}. The value 'null' indicates that R0 has no PH in the FT. The Cq is initialized using the following steps. First, all nodes that are coupled in the NT to R0 are collected in a set {Ra, Rb, . . . Rn}. The set {Ra, Rb, . . . Rn} is ordered from lowest to highest nodeID. Second, a node descriptor (Rx,0,R0) for each node Rx in {Ra, Rb, . . . Rn} is added to the Cq. The Cq is thus initialized to {(Ra,0,R0), (Rb,0,R0), . . . , (Rn,0,R0)}.

In step 104, the first node descriptor for a node X in the Cq is removed from the Cq, the value D in X's node descriptor is set to 1, and the node descriptor for X is appended to the end of the FT. Additionally, 1 is added to the value D of X's PH.

In step 106, a determination is made whether all nodes in the NT are included in the FT. If so, the method 100 continues with step 114 of the sub-process 100b. If all nodes in the NT are not included in the FT, the method 100 continues with step 108.

In step 108, a determination is made whether the Cq is empty. If so, the method 100 is operating on an 'island' of nodes that are unconnected to other nodes of the NT, and in step 110, the method 100 causes messages reporting the existence of the island of nodes to be sent to an administrator of the network and to a component of a router in the network, and the method 100 ends. If the Cq is not empty, the method 100 proceeds with step 112.

In step 112, all nodes that are coupled in the NT to X (from step 104) and are not already in the FT are collected in a set {Ra, Rb, . . . Rn}. The set {Ra, Rb, . . . Rn} is ordered from lowest to highest nodeID. Second, a node descriptor (Rx,0,X) for each node Rx in {Ra, Rb, . . . Rn} is appended to the end of the Cq. Then, the method 100 goes to step 104.

In the method 100, R0 is selected as the network node having the lowest nodeID, the Cq is initialized in step 102 with nodes ordered from lowest to highest nodeID, and nodes added to the Cq in step 112 are ordered from lowest to highest nodeID before being added to the Cq. In other embodiments, R0 is selected as the network node having the highest nodeID, the Cq is initialized in step 102 with nodes ordered from highest to lowest nodeID, and nodes added to the Cq in step 112 are ordered from highest to lowest nodeID before being added to the Cq. In still other embodiments, other suitable criteria for selecting R0 and ordering nodes before being added to the Cq may be used to provide a breadth-first process for computing FT in the method 100.

In step 114, the sub-process 100b for ensuring that all nodes in the FT have at least two links in the FT begins. In step 114, the first node (Q) in the FT that has a D=1 and the lowest nodeID if two or more nodes have their D=1 is found. If a determination is made that no such node Q exists in the FT, then the FT is a complete FT and in step 116, the method 100 causes the FT to be sent to a component of a router in the network and the method 100 ends.

If it is determined in step 114 that there is a node Q with D=1, then in step 118 all nodes that are coupled in the NT to Q are collected in a set {Ra, Rb, . . . Rn}. Next, a node (L) having the lowest value of D and the lowest nodeID if two or more nodes have the same lowest value of D is found in {Ra, Rb, . . . Rn}, and the values of D for both nodes Q and L are incremented by 1 in the FT. Finally, a link between Q and L is added in the FT by adding a node descriptor (Q,d,L) to the FT, where d is equal to the incremented value of D for node Q, and the method 100 goes to step 114.

Figure 2A:
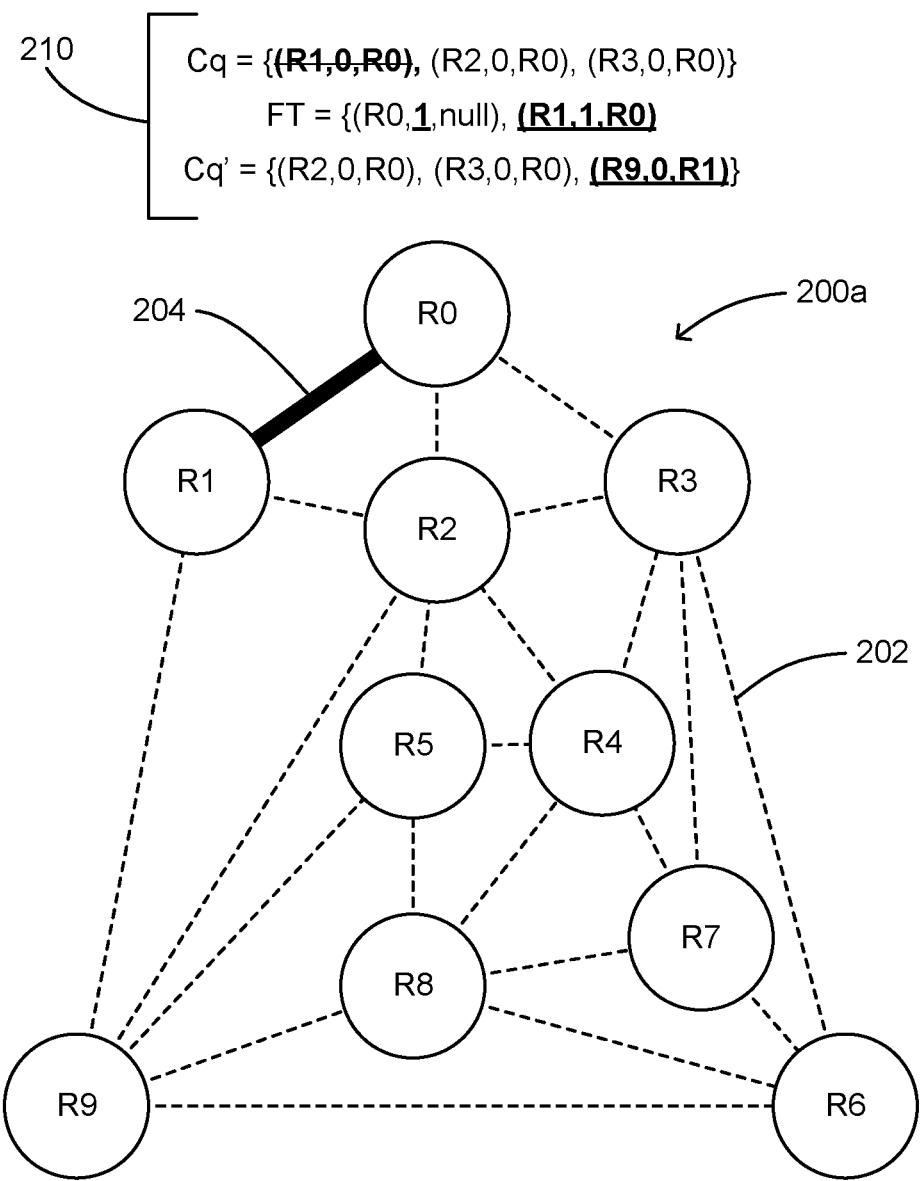
FIGS. 2A-F present data structures and a network diagram illustrating iterations of the method of FIG. 1.

FIGS. 2A-F present data structures and a network diagram illustrating iterations of the method 100 of FIG. 1. In FIG. 2A, a network diagram 200a graphically represents a status of the NT and the FT after a first iteration through the steps of the sub-process 100a of FIG. 1. Dotted line 202 represents a link in the NT between nodes R3-R6. Other such dotted lines represent other links between nodes in the NT. Bold line 204 indicates that R1 has been added to the FT with R0 as its PH. Data structures 210 show that the iteration begins with the Cq={(R1,0,R0), (R2,0,R0), (R3,0,R0)}. In step 104, the node descriptor for R1 (or say R1 for short) is removed from the Cq and added to the FT. All nodes in the network are not in the FT and the Cq is not empty, so in step 112, node R9 is added to the Cq (indicated as Cq'), and the method 100 goes to step 104 for a second iteration.

Figure 2B:
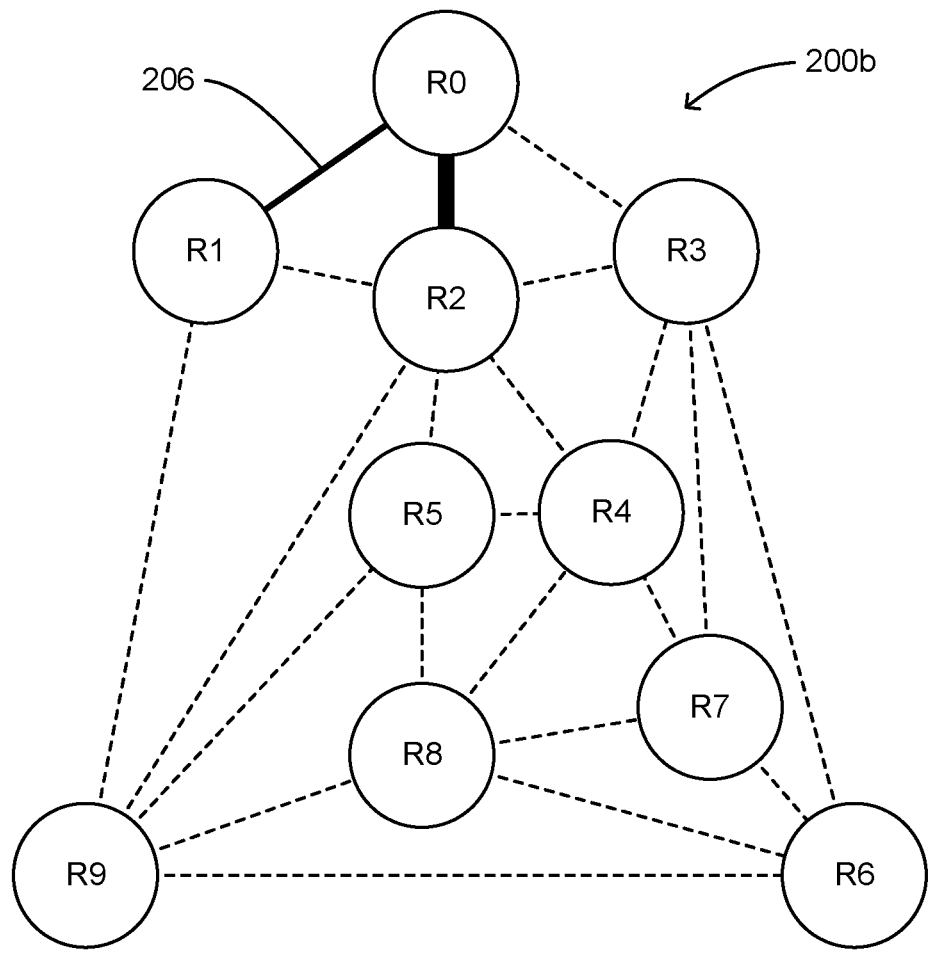

FIG. 2B shows the results of the second iteration of the steps of the sub-process 100a. In network diagram 200b, a solid line 206 shows that R1 is linked to R0 in the FT and a bold line indicates that R2 has been added to the FT with R0 as its PH. The data structures show that R2 has been removed from the Cq and added to the FT, and R4 and R5 have been added to the Cq'.

Figure 2C:
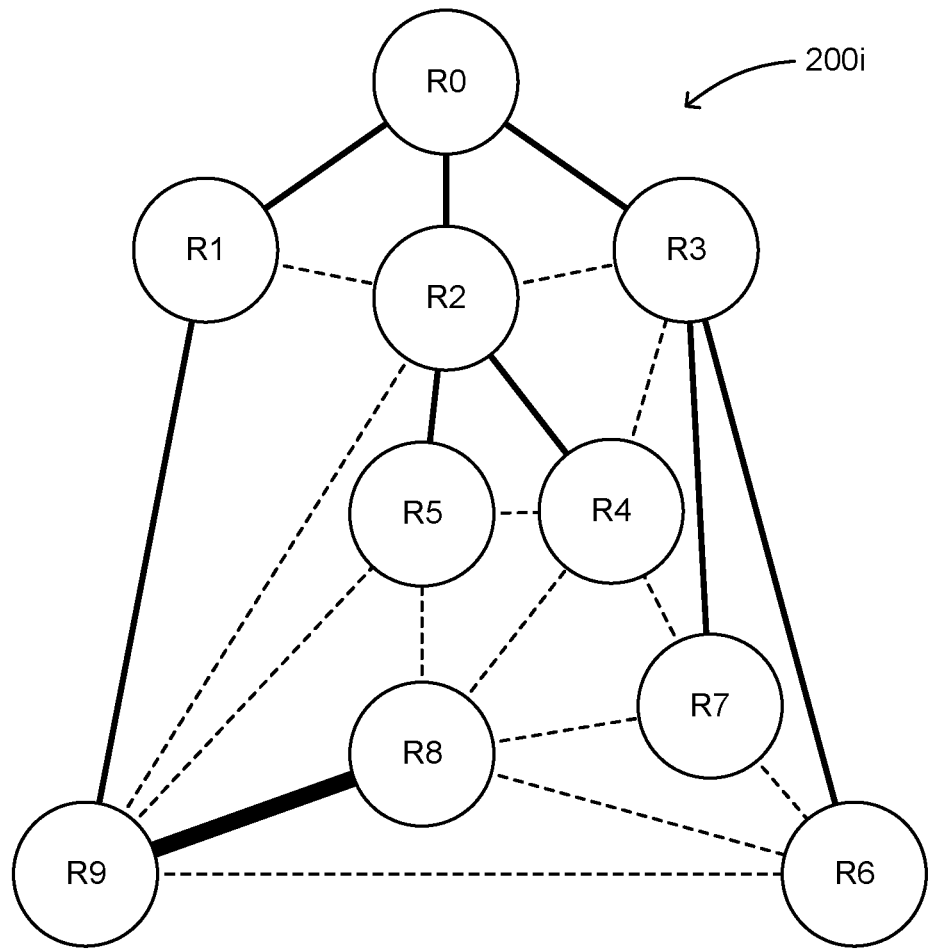

FIG. 2C shows the results of a ninth, and final, iteration of the steps of the sub-process 100a. In network diagram 200i, solid lines show that nodes R1-R7 and R9 have been added to the FT in previous iterations and a bold line indicates that R8 has been added to the FT with R9 as its PH in this iteration. The data structures show that R8 has been removed from the Cq and added to the FT. Step 106 determines that all nodes R0-R9 are in the FT and the method 100 continues with step 114.

Figure 2D:
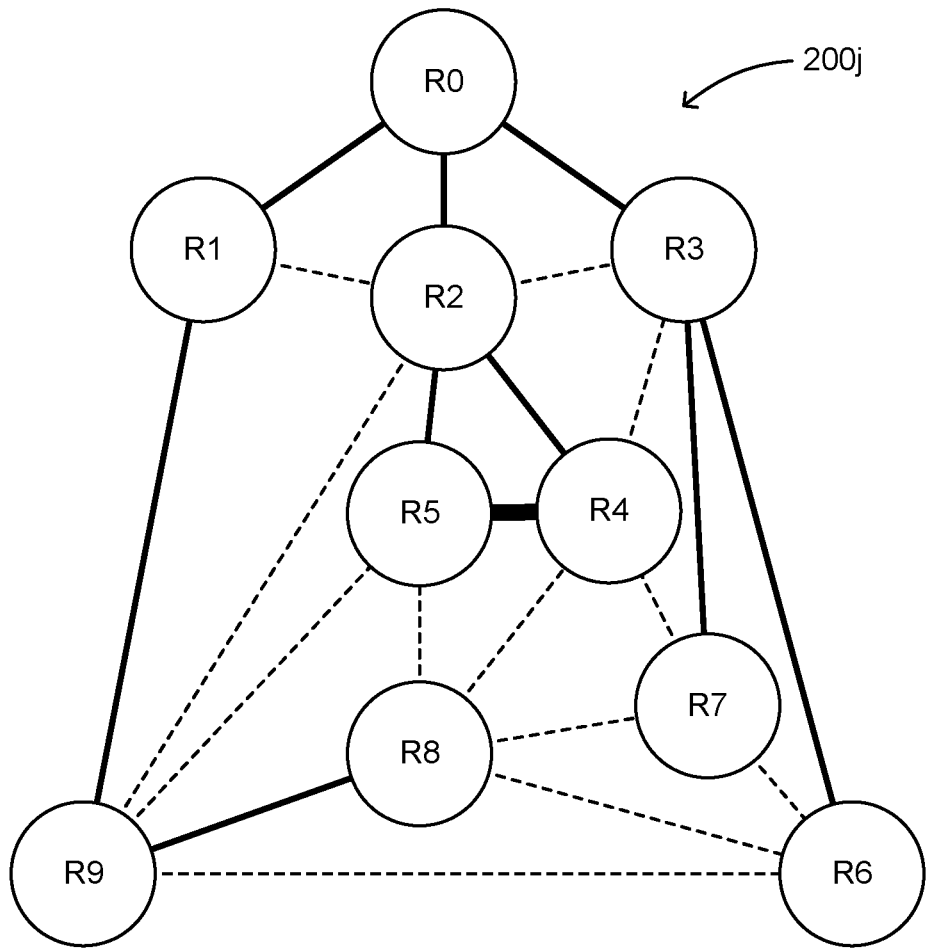

FIG. 2D shows the results of a first iteration through the steps of the sub-process 100b. Data structures 220 show that, in step 114, it is determined that node R4 has D=1 in the FT and the lowest nodeID and, in step 118, it is determined that R5 is the node coupled to R4 with the lowest value of D and the lowest nodeID and the values of D for both R4 and R5 are incremented by 1 (data structure FT'), and a node descriptor (R4,2,R5) for the link between R4 and R5 is added to the FT'. The network diagram 200j shows the link thereby established in the FT between nodes R4 and R5.

Figure 2E:
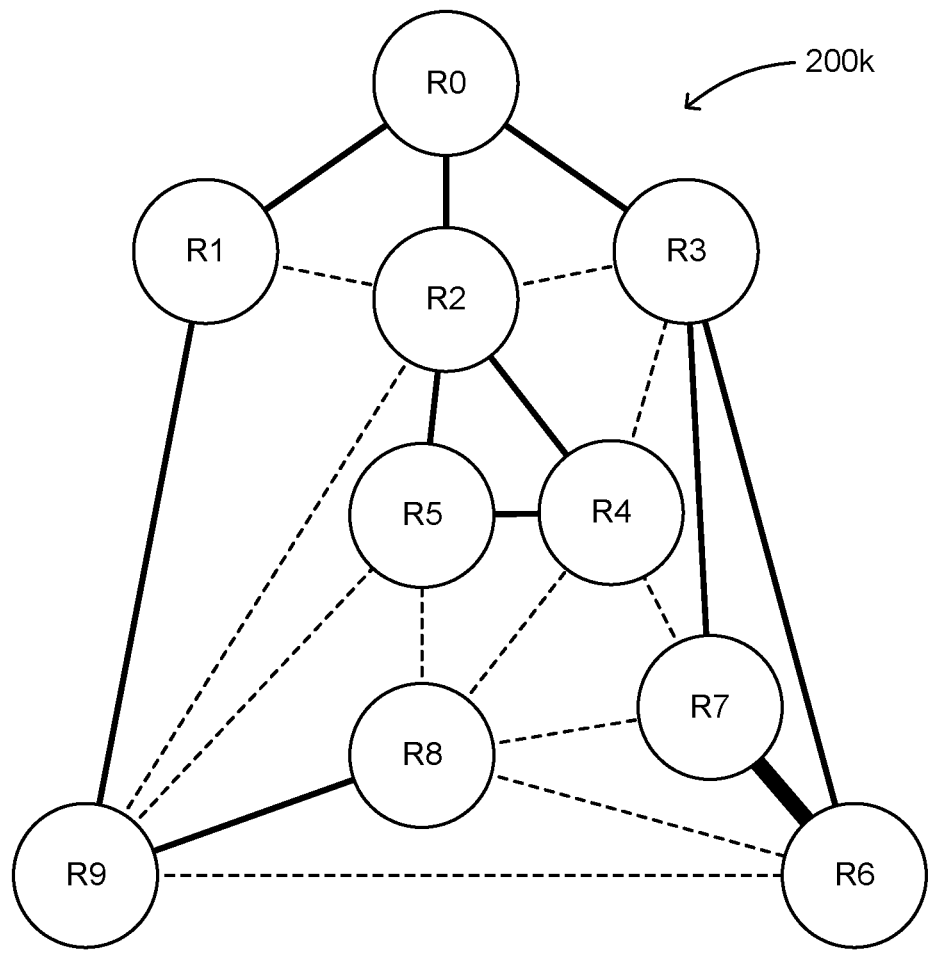

FIG. 2E shows the results of a second iteration through the steps of the sub-process 100b. In step 114, it is determined that node R6 has D=1 and the lowest nodeID and, in step 118, it is determined that R7 is the node coupled to R6 with the lowest value of D and the lowest nodeID and the values of D for both R6 and R7 are incremented by 1, and a node descriptor (R6,2,R7) for the link between R6 and R7 is added to the FT'. The network diagram 200k shows the link thereby established in the FT between nodes R6 and R7.

Figure 2F:
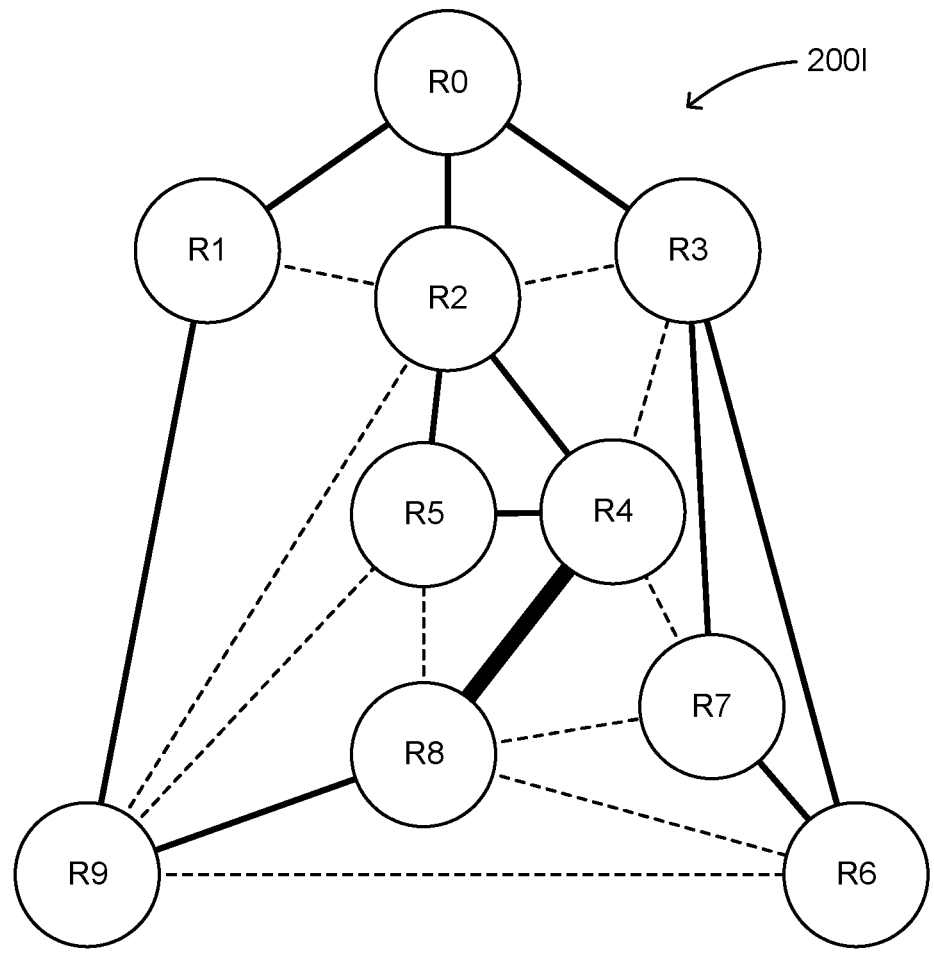

FIG. 2F shows the results of a third iteration through the steps of the sub-process 100b. In step 114, it is determined that node R8 has D=1 and, in step 118, it is determined that R4 is the node coupled to R8 with the lowest value of D and the lowest nodeID and the values of D for both R4 and R8 are incremented by 1, and a node descriptor (R8,2,R4) for the link between R8 and R4 is added to the FT'. The network diagram 200l shows the link thereby established in the FT between nodes R8 and R4.

Figure 2G:
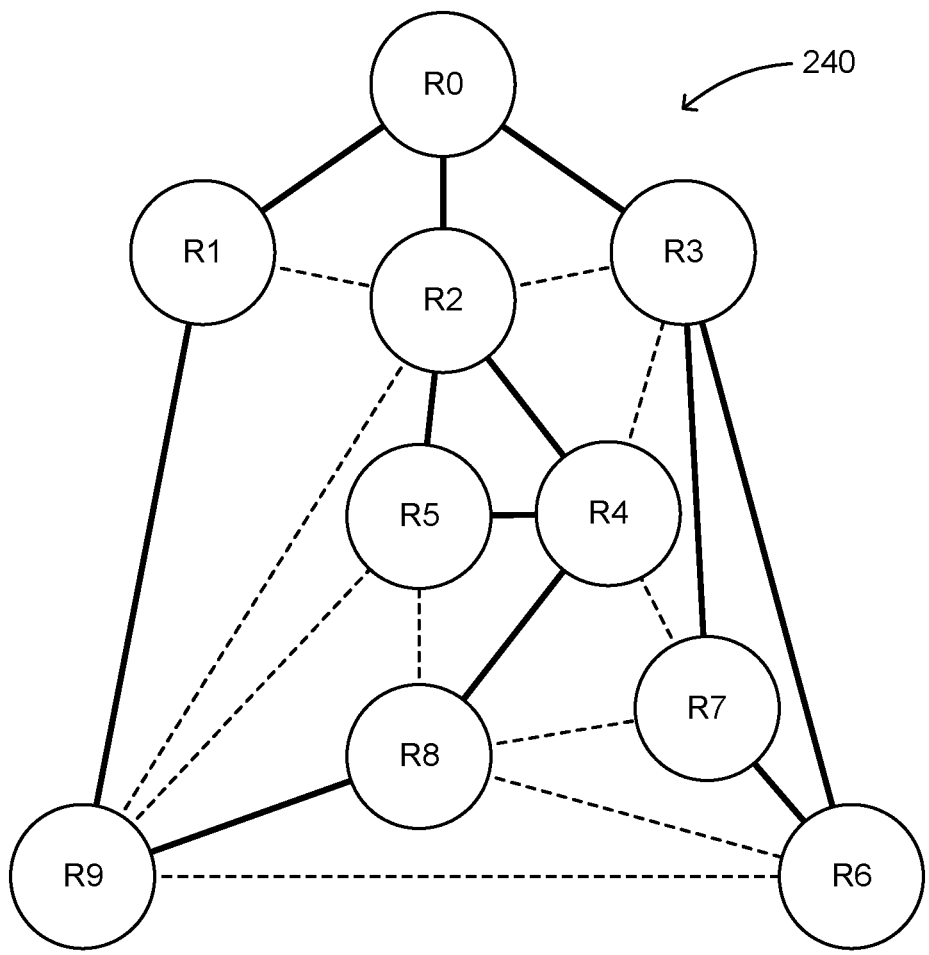
FIG. 2G presents the FT computed by the method of FIG. 1 and a network diagram illustrating the FT.

On the next iteration of step 114, no node with D=1 is found in the FT and, in step 116, the method 100 sends the FT to a component of the router in the network and terminates. FIG. 2G presents the FT 230 computed by the method 100 of FIG. 1 and a network diagram 240 illustrating the FT 230.

Figure 3A:
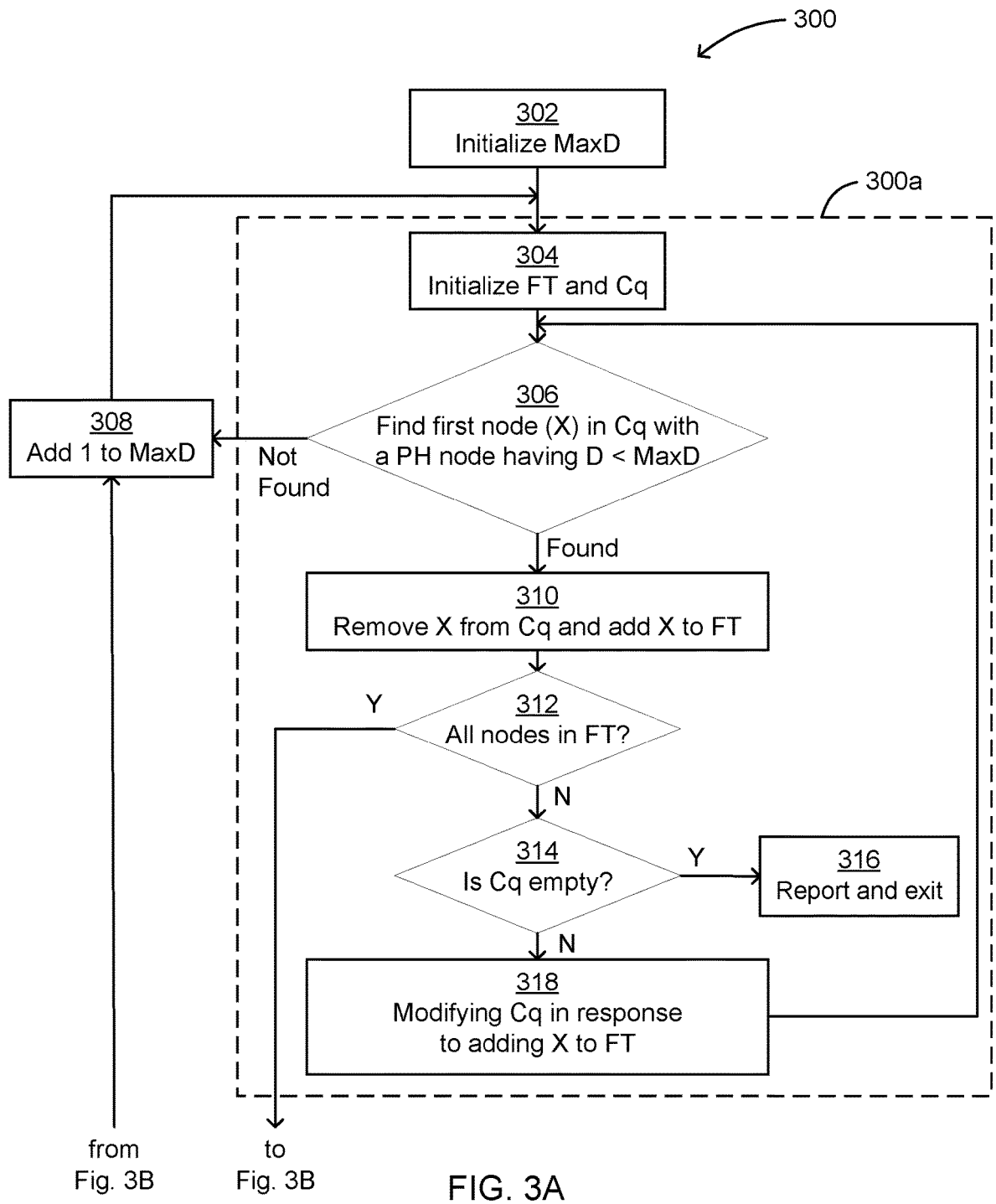
FIGS. 3A and 3B present flow charts illustrating first and second sub-processes, respectively, of a second method according to an embodiment of the present disclosure for computing a FT.
Figure 3B:
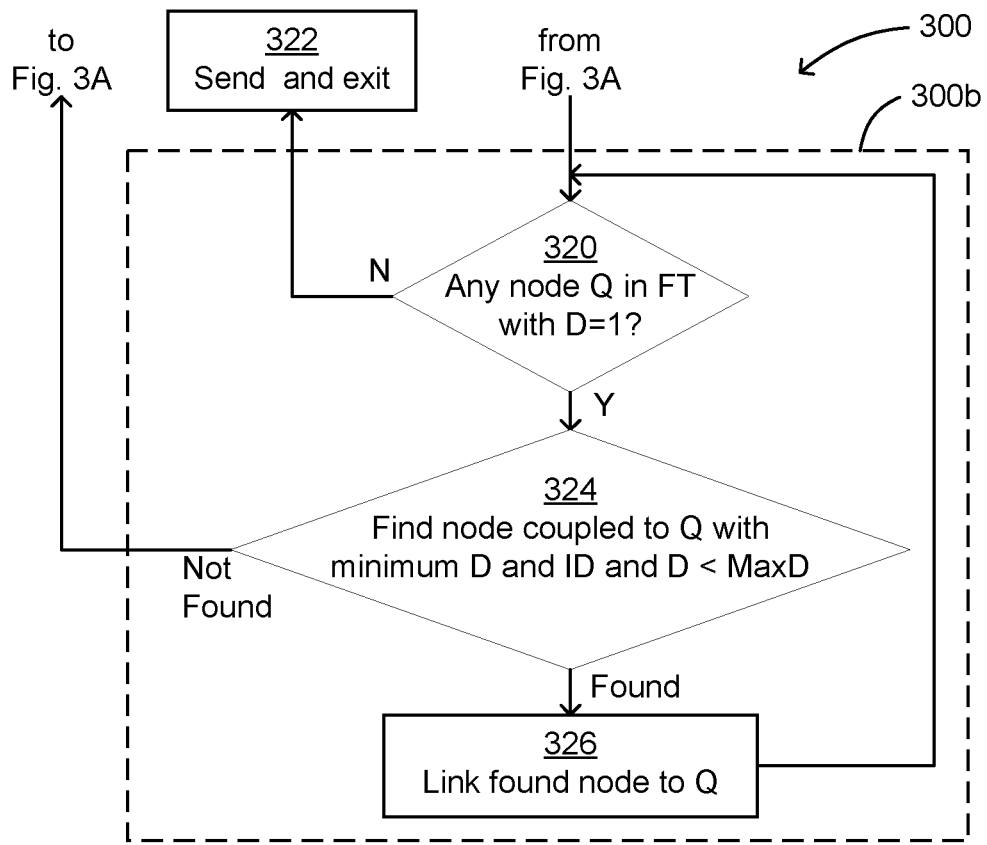
Figure 3C:
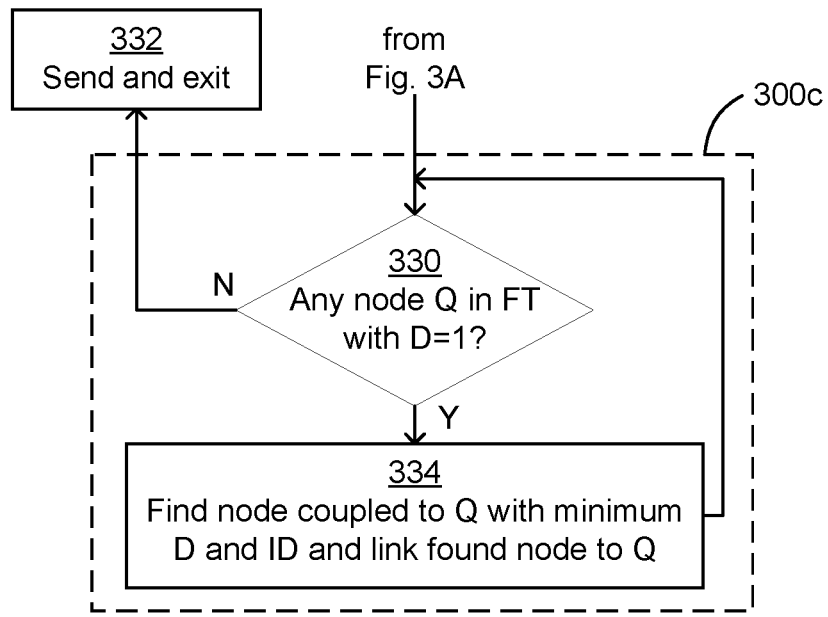
FIG. 3C presents a flow chart of a sub-process that is an alternative version of the sub-process of FIG. 3B.

FIGS. 3A and 3B present flow charts illustrating first and second sub-processes, respectively, of a second method 300 according to an embodiment of the present disclosure for computing a FT. The method 300 includes a sub-process 300a (shown in FIG. 3A) for computing a FT that includes all the nodes in the network and a sub-process 300b (shown in FIG. 3B) for ensuring that all nodes in the FT have at least two links in the FT. FIG. 3C presents a flow chart of a sub-process 300c that is an alternative version of the sub-process 300b of FIG. 3B.

The FT is represented in the method 300 by an ordered set of node descriptors (nodeID, D, PHs), where nodeID is the ID of the node in the NT, D is the degree of the node in the FT, and PHs is a set of one or more nodeIDs of Previous Hop(s) to which the node is linked in the FT. A set data structure containing the FT is referred as FT to in the description of the method 300. The FT is built by adding and modifying node descriptors in the FT as the method 300 proceeds through iterations of the sub-processes 300a and 300b.

In step 302, an upper limit on the degree of any node in the FT is selected and a value of a variable MaxD (Maximum Degree) is initialized to that upper limit. In several embodiments, the method 300 computes a FT having a minimized MaxD. In some embodiments of the disclosure, MaxD is set to a small number, and the method 300 is run. In the embodiment shown in FIGS. 3A and 3B, if either sub-process 300a or sub-process 300b cannot complete without a node in the FT exceeding MaxD, the method 300 increments MaxD by one and restarts, repeating such restarts until a value of MaxD is found for which the method 300 successfully completes.

In step 304, a root node R0 in the network having the lowest nodeID is selected, and the FT is initialized to {(R0, 0, { })}. The Cq is initialized using the following steps. First, all nodes that are coupled in the NT to R0 are collected in a set {Ra, Rb, . . . Rn}. The set {Ra, Rb, . . . Rn} is ordered from lowest to highest nodeID. Second, a node descriptor (Rx,0, {R0}) for each node Rx in {Ra, Rb, . . . Rn} is added to the Cq. The Cq is thus initialized to {(Ra,0, {R0}), (Rb,0, {R0}), . . . , (Rn,0, {R0})}.

In step 306, the first node descriptor (say node X for short) in the Cq is found that has a node in its PHs (say node Y for short) whose D is less than MaxD. If such a node is found, the method 300 proceeds to step 310. If no such node is found, the method 300 proceeds to step 308, where MaxD is incremented by one and the method 300 goes to step 304 to start over, using the higher value of MaxD.

In some embodiments, the node descriptors stored in the Cq include a fourth value, W, which indicates that the node has been passed over in step 306 because it does not have a node in its PHs whose D is less than MaxD. Nodes that have not yet been evaluated in step 306 have W=0. In such embodiments, the value W of a node in the Cq is reset to 0 in step 318 when a new previous hop is added to the node's PHs (described below). Such embodiments may operate more efficiently than the embodiment shown in FIGS. 3A and 3B.

In step 310, the node descriptor X is removed from the Cq, the value D in X is set to 1, and X's PHs is reduced to include only the nodeID of the node Y found in step 306. Thus modified, X is added to the end of the FT. Additionally, 1 is added to the value D of the node Y.

In step 312, a determination is made whether all nodes in the NT are included in the FT. If so, the sub-process 300a has completed successfully and the method 300 continues with step 320 of the sub-process 300b (shown in FIG. 3B). If all nodes in the NT are not included in the FT, the method 300 continues with step 314.

In step 314, a determination is made whether the Cq is empty. If so, the method 300 is operating on an 'island' of nodes that are unconnected to other nodes of the NT, and in step 316, the method 300 causes messages reporting the existence of the island of nodes to be sent to an administrator of the network and to a component of the router in the network, and the method 300 ends. If the Cq is not empty, the method 300 proceeds with step 318.

In step 318, the Cq is modified in response to adding X (described in step 310) to the FT. All nodes that are coupled in the NT to X and are not already in the FT are collected in a queue {Ra, Rb, . . . Rn} ordered from lowest nodeID to highest nodeID. For each node Z in {Ra, Rb, . . . Rn}, if Z is in the Cq, add X to the end of Z's PHs. In other embodiments, the nodes in Z's PHs are maintained in a desired order, for example the nodes in Z's PHs may be ordered by their values of D from lowest value to highest value. In such embodiments, if two or more nodes in Z's PHs have equal values of D, they are ordered in Z's PHs by lowest nodeID to highest nodeID.

If Z is not in the Cq, append a node descriptor (Z,0, {X}) to the end of the Cq. The method 300 then goes to step 306. In embodiments where the node descriptors stored in the Cq include the fourth value, W, prior to going to step 306, new node descriptors added to the Cq in step 318 are given an initial value of W=0, and for any node descriptor having X added to its PHs, W is reset to 0.

As described for the method 100, in other embodiments of the method 300, R0 is selected as the network node having the highest nodeID, the Cq is initialized in step 304 with nodes ordered from highest to lowest nodeID, and nodes added to the Cq in step 318 are ordered from highest to lowest nodeID before being added to the Cq. In still other embodiments, other suitable criteria for selecting R0 and ordering nodes before addition to the Cq may be used to provide a breadth-first process for computing FT in the method 300.

In step 320, the sub-process 300b begins for ensuring that all nodes in the FT have at least two links in the FT. In step 320, the first node (Q) in the FT that has a D=1 and the lowest nodeID if two or more nodes have their D=1 is found. If it is determined that no such node Q exists in the FT, then the sub-process 300b has completed successfully and the FT is a complete FT. In step 322, the method 300 causes the FT to be sent to a component of a router in the network and the method 300 ends.

If it is determined in step 320 that there is a node Q with D=1, then in step 324 all nodes that are coupled in the NT to Q are collected in a set {Ra, Rb, . . . Rn}. Also in step 324, a node (L) is found in {Ra, Rb, . . . Rn}, where L has (i) the lowest value of D, (ii) the lowest nodeID if two or more nodes have the same lowest value of D, and (iii) D<MaxD. If no node L is found, the method 300 goes to step 308 to increment MaxD and start over. If a node L is found, then in step 326 the node L is linked to node Q by incrementing by 1 the values of D for both nodes Q and L in the FT, and adding node L into node Q's PHs. The method 300 then goes to step 320.

FIG. 3C presents a flow chart of a sub-process 300c that is an alternative version of the sub-process 300b of FIG. 3B. In another embodiment of the disclosure, the method 300 comprises the sub-process 300a (as described with reference to FIG. 3A) for computing a FT that includes all the nodes in the network and the sub-process 300c for ensuring that all nodes in the FT have at least two links in the FT. The sub-process 300c begins with step 330, which is identical to step 320 as described for the sub-process 300b. If step 330 determines that no node remains in the FT with D=1, then the sub-process 300c has completed successfully and step 330 goes to step 332. Upon completion of the sub-process 300c, the FT may include some nodes having D greater than MaxD. In step 332, if such nodes are found in the FT, the value of MaxD is increased to the largest value of D found in the FT. After such a change (if any) has been made to the value of MaxD, in step 332 the method 300 causes the FT to be sent to a component of a router in the network and the method 300 ends.

If it is determined in step 330 that there is a node Q with D=1, then in step 334 all nodes that are coupled in the NT to Q are collected in a set {Ra, Rb, . . . Rn}. Also in step 334, a node (L) is found in {Ra, Rb, . . . Rn}, where L has (i) the lowest value of D and (ii) the lowest nodeID if two or more nodes have the same lowest value of D. The node L is then linked to node Q by incrementing by 1 the values of D for both nodes Q and L in the FT, and adding node L into node Q's PHs. The method 300 then goes to step 330.

FIGS. 4A-E present data structures and a network diagram illustrating iterations of the method of FIGS. 3A and 3B. In FIGS. 4A-E, MaxD=3.

Figure 4A:
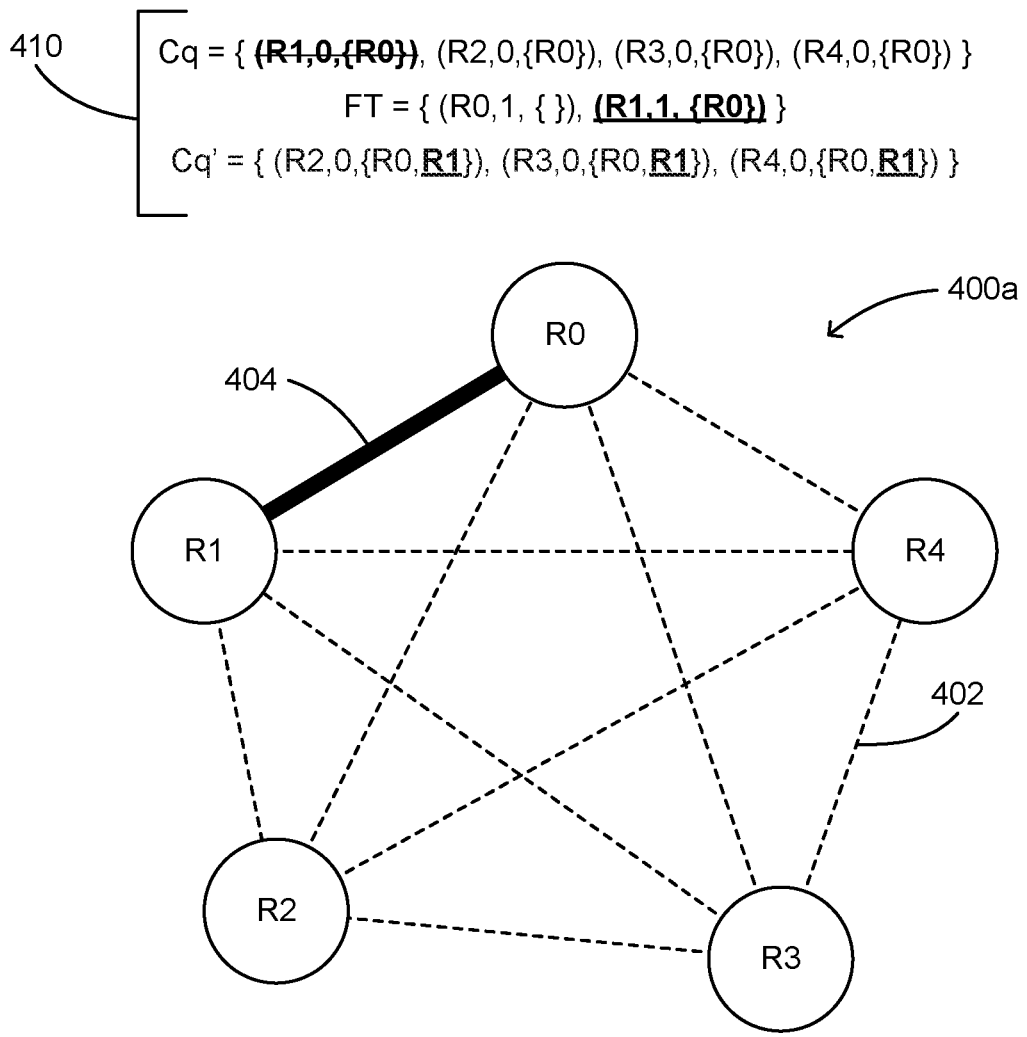
FIGS. 4A-E present data structures and a network diagram illustrating iterations of the method of FIGS. 3A and 3B.

In FIG. 4A, a network diagram 400a graphically represents a status of the NT and the FT after a first iteration through the steps of the sub-process 300a of FIG. 3A. Dotted line 402 represents a link in the NT between nodes R3-R4. Other such dotted lines represent other links between nodes in the NT. Bold line 404 indicates that R1 has been added to the FT with R0 as its PH. Data structures 410 show that the iteration begins with the Cq={(R1,0, {R0}), (R2,0, {R0}), (R3,0, {R0}), (R4,0, {R0})}. In step 310, R1 is removed from the Cq and added to the FT. All nodes in the network are not in the FT and the Cq is not empty, so in step 318, it is determined that the nodes that are linked to R1 and not in the FT are R2, R3, and R4, so R1 is added to the PHs for each of nodes R2, R3, and R4 in the Cq. The results of step 318 are shown in Cq'. The method 300 then goes to step 306 for a second iteration.

Figure 4B:
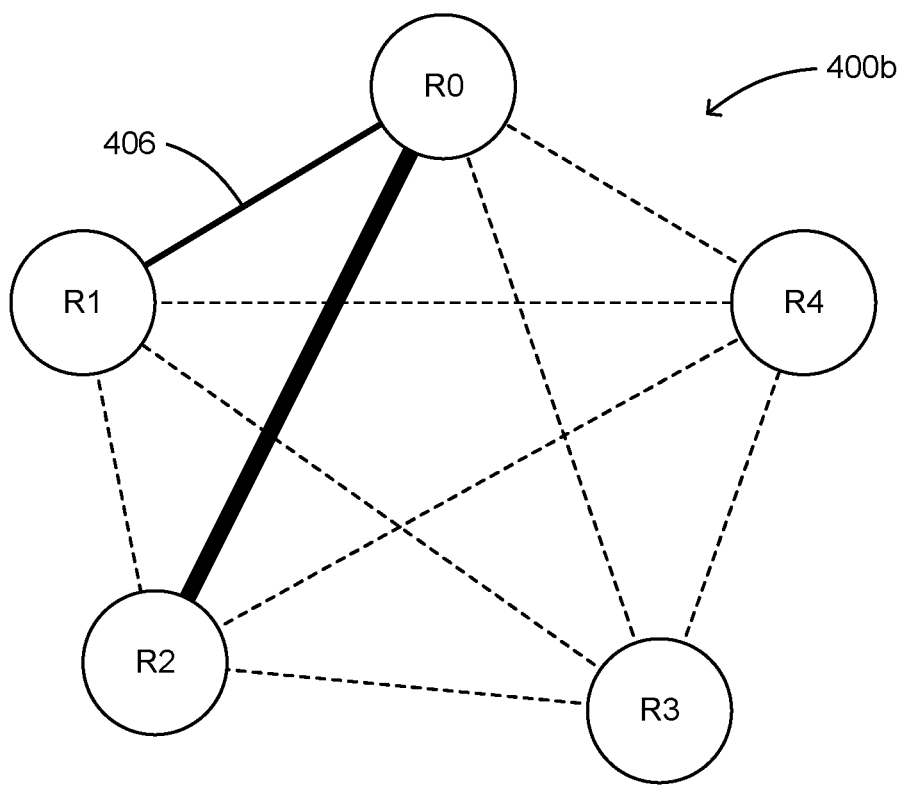

FIG. 4B shows the results of a second iteration of the steps of the sub-process 300a. In network diagram 400b, a solid line 406 shows that R1 is linked to R0 in the FT and a bold line indicates that R2 has been added to the FT with R0 as its PH. The data structures show that R2 has been removed from the Cq and the link between R2 and R0 is added to the FT, and R2 has been added to the PHs of each of R3 and R4 in the Cq'.

Figure 4C:
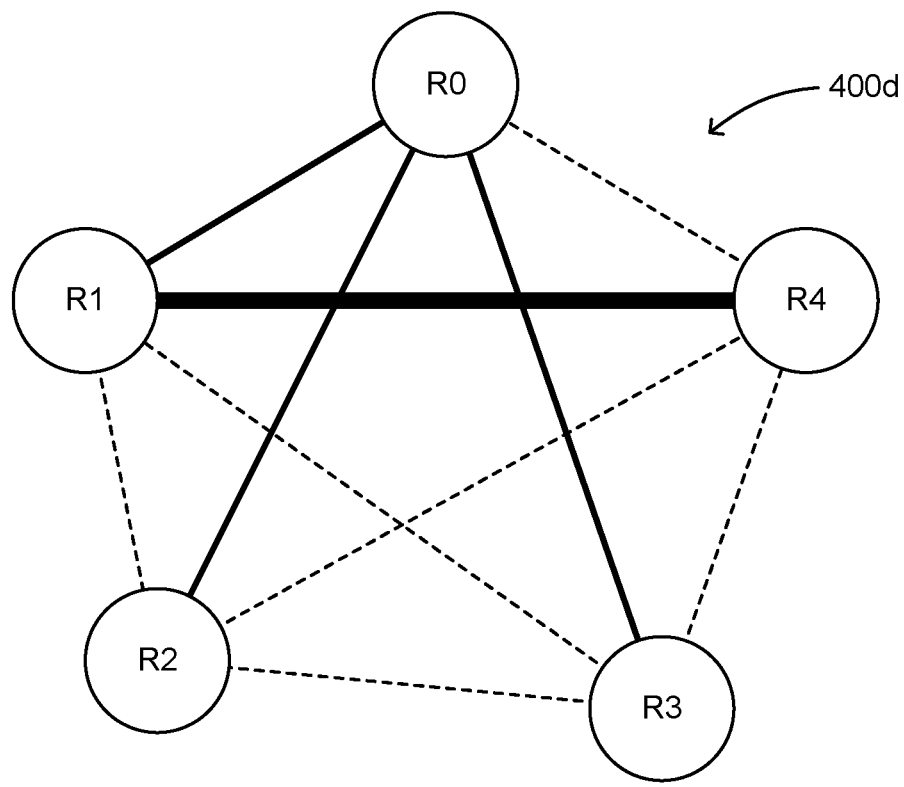

FIG. 4C shows the results of a fourth, and final, iteration of the steps of the sub-process 300a. In network diagram 400d, solid lines show that nodes R1-R3 have been added to the FT in previous iterations and a bold line indicates that R4 and the link between R4 and R1 has been added to the FT in this iteration, with R1 as its PH. The data structures show that R4 has been removed from the Cq and the link between R4 and R1 is added to the FT. Step 312 determines that all nodes R0-R4 are in the FT and the method 300 continues with step 320.

Figure 4D:
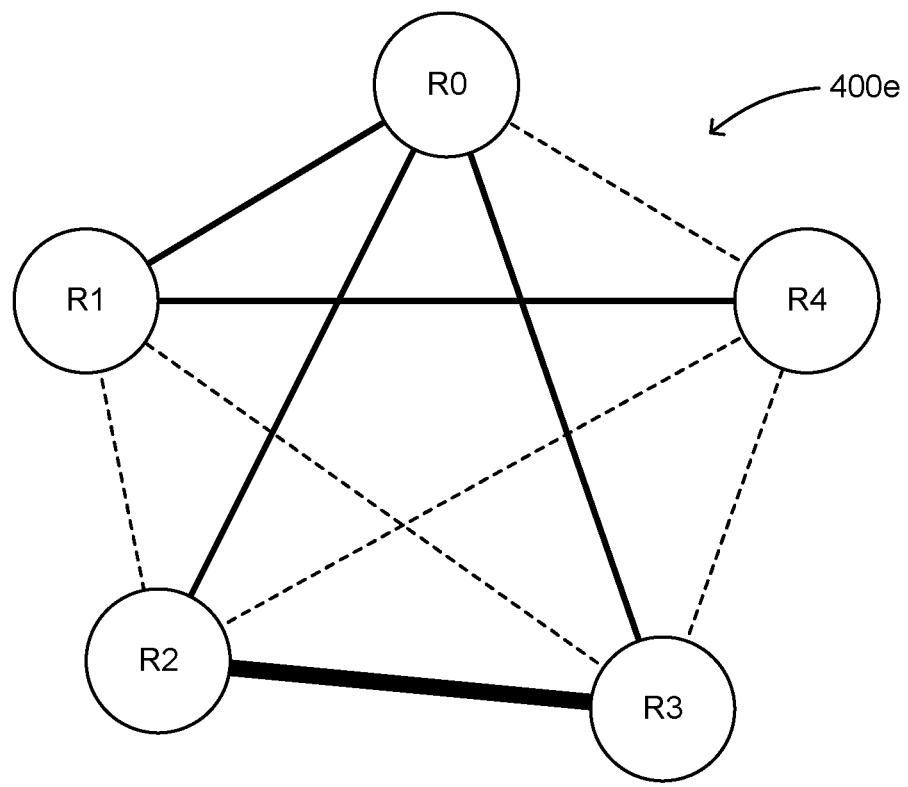

FIG. 4D shows the results of a first iteration through the steps of the sub-process 300b of FIG. 3B. Data structures 420 show that, in step 320, it is determined that node R2 has D=1 (data structure FT) and the lowest nodeID even though each of R3 and R4 has D=1 and, in step 326, it is determined that R3 is the node coupled to R2 with the lowest value of D, the lowest nodeID, and D<MaxD. In step 328 the values of D for both R2 and R3 are incremented by 1 (data structure FT'), and R3 is added in R2's PHs. The network diagram 400e shows the link thereby established in the FT between nodes R2 and R3.

Figure 4E:
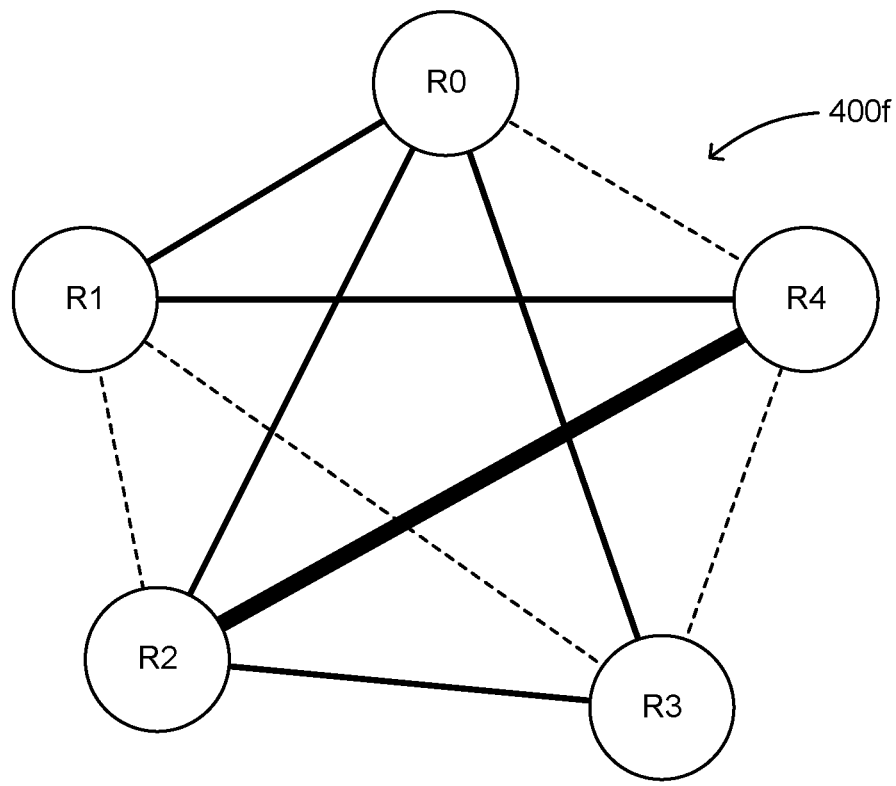

FIG. 4E shows the results of a second iteration through the steps of the sub-process 300b. In step 320, it is determined that node R4 has D=1 and, in step 326, it is determined that R2 is the node coupled to R4 with the lowest value of D, the lowest nodeID, and D<MaxD. In step 328 the values of D for both R2 and R4 are incremented by 1 and R2 is added in R4's PHs. The network diagram 400f shows the link thereby established in the FT between nodes R2 and R4.

Figure 4F:
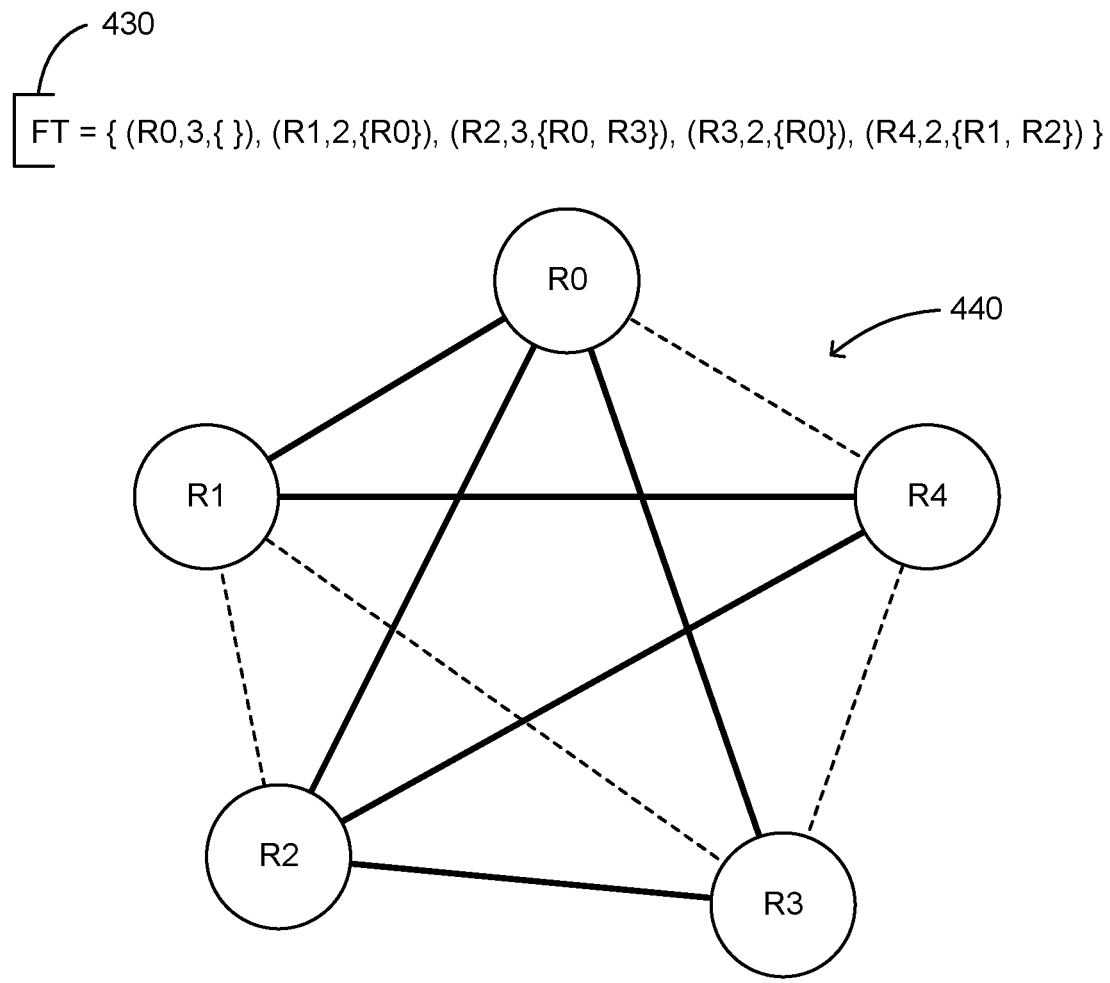
FIG. 4F presents the FT computed by the method of FIGS. 3A and 3B and a network diagram illustrating the FT.

On the next iteration of step 320, no node with D=1 is found in the FT and, in step 322, the method 300 sends the FT to the component of the router in the network and terminates. FIG. 4F presents the FT 430 computed by the method 300 of FIGS. 3A and 3B and a network diagram 440 illustrating the FT 430.

Figure 5A:
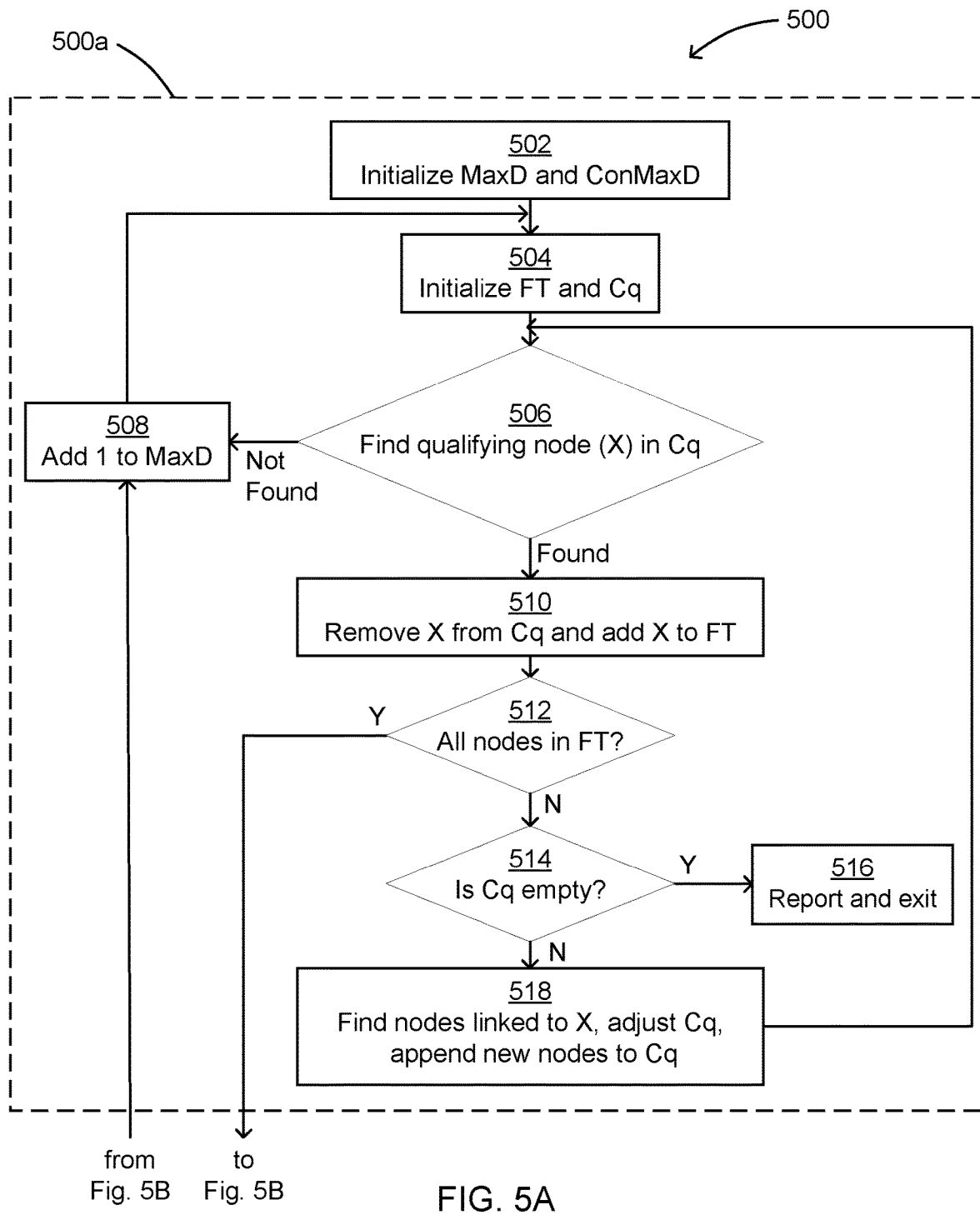
FIGS. 5A and 5B present flow charts illustrating first and second sub-processes, respectively, of a third method according to an embodiment of the present disclosure for computing a FT.
Figure 5B:
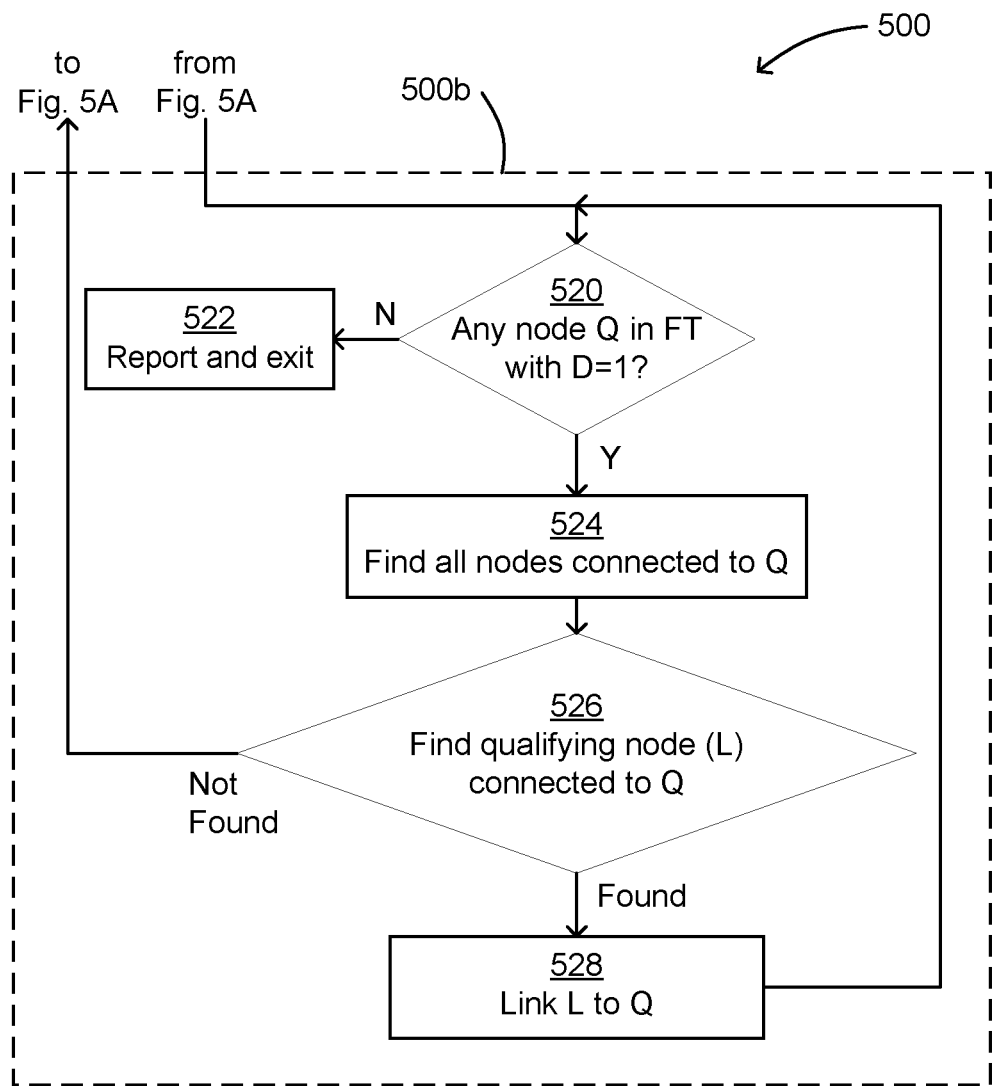

FIGS. 5A and 5B present flow charts illustrating first and second sub-processes, respectively, of a third method 500 according to an embodiment of the present disclosure for computing a FT. The method 500 includes a first sub-process 500a (shown in FIG. 5A) for computing a FT that includes all the nodes in the network and a second sub-process 500b (shown in FIG. 5B) for ensuring that all nodes in the FT have at least two links in the FT.

The FT is represented in the method 500 by an ordered set of node descriptors (nodeID, D, PHs), where nodeID is the ID of the node in the NT, D is the degree of the node in the FT, and PHs is a set of one or more nodeIDs of Previous Hop(s) to which the node is linked in the FT. A set data structure containing the FT is referred to in the description of the method 500 as FT. The FT is built by adding and modifying node descriptors to the FT as the method 500 proceeds through iterations of the sub-processes 500a and 500b.

In step 502, a variable MaxD (Maximum Degree) representing an upper limit on the degree in the FT of some nodes of the NT is initialized. Also in step 502, stored information is obtained (originally obtained from a network administrator) that identifies a subset of the nodes of NT that have a constraint on their maximum degree in the FT. A value ConMaxD (Constrained Maximum Degree) is set to that constraint value. MaxD is a value that the method 500 attempts to minimize for nodes that are not in the subset. Nodes that are not in the subset of the nodes of NT may be referred to herein as nodes of a first type. Nodes that are in the subset of the nodes of NT may be referred to herein as nodes of a second type. ConMaxD is a value that, for network reasons, the method 500 cannot exceed. As an example, leaf nodes in a spine-and-leaf topology network might be assigned ConMaxD=2.

In several embodiments, the method 500 computes a FT having a constrained and minimized MaxD. In some embodiments of the disclosure, MaxD is set to a small number, and the method 500 is run. If either sub-process 500a or sub-process 500b cannot complete without a node in the FT exceeding MaxD, the method 500 increments MaxD by one and restarts, repeating such restarts until a value of MaxD is found for which the method 500 successfully completes.

In other embodiments, once the method 500 has been completed successfully, the successful value of MaxD is stored and, should the NT change and a recomputing of the FT be required, the method 500 begins by initializing MaxD to the stored value of MaxD. In some such embodiments, if the method 500 completes successfully, then rather than ending in step 522 (described below), the method 500 returns to step 502 and initializes MaxD to successively smaller values until the method 500 finally fails to complete. In such embodiments, once the method 500 fails to complete, the immediately preceding value of MaxD is stored and the FT computed using the previous MaxD is used as the computed FT for the network.

In step 504, a root node R0 in the network having the lowest nodeID is selected, and the FT is initialized to {(R0, 0, { })}. The Cq is initialized using the following steps. First, all nodes that are coupled in the NT to R0 are collected in a set {Ra, Rb, . . . Rn}. The set {Ra, Rb, . . . Rn} is ordered from lowest to highest nodeID. Second, a node descriptor (Rx,0, {R0}) for each node Rx in {Ra, Rb, . . . Rn} is added to the Cq. The Cq is thus initialized to {(Ra,0, {R0}), (Rb,0, {R0}), . . . , (Rn,0, {R0})}.

In step 506, the first node (say node X for short) in the Cq is found that qualifies for inclusion in the FT. The node X qualifies for inclusion in the FT if either the node is a network node of the first type and has a node (say node Y for short) in its PHs whose D is less than MaxD or the node is a network node of the second type and has a node Y in its PHs whose D is less than ConMaxD. If it is determined that the Cq includes a node X, the method 500 proceeds to step 510. If it is determined that the Cq does not include a node X, the method 500 proceeds to step 508, where MaxD is incremented by one and the method 500 goes to step 504 to start over, using the higher value of MaxD.

In some embodiments, the node descriptors stored in the Cq include a fourth value, W, which indicates that the node has been evaluated and passed over in step 506 because it is not a qualifying node. Nodes that have not yet been evaluated in step 506 have W=0. Nodes that have been evaluated and passed over have W=1. In such embodiments, the value W of a node with a new previous hop added to its PHs in the Cq is reset to 0 in step 518 (described below). Such embodiments may operate more efficiently than the embodiment shown in FIGS. 5A and 5B.

In step 510, the node X is removed from the Cq, the value D in X's node descriptor is set to 1, and X's PHs is reduced to include only the nodeID of the node Y found in step 506. Thus modified, the node descriptor for X is added to the end of the FT. Additionally, 1 is added to the value D of the sole node in X's PHs.

In step 512, a determination is made whether all nodes in the NT are included in the FT. If it is determined that all nodes in the NT are included in the FT, the method 500 continues with step 520 of the sub-process 500b (shown in FIG. 5B). If it is determined that all nodes in the NT are not included in the FT, the method 500 continues with step 514.

In step 514, a determination is made whether the Cq is empty. If so, the method 500 is operating on an 'island' of nodes that are unconnected to other nodes of the NT, and in step 516, the method 500 causes messages reporting the existence of the island of nodes to be sent to an administrator of the network and to a component of a router in the network, and the method 500 ends. If the Cq is not empty, the method 500 proceeds with step 518.

In step 518, all nodes that are coupled in the NT to X (described in step 506) and are not already in the FT are collected in a set {Ra, Rb, . . . Rn}. The set {Ra, Rb, . . . Rn} is ordered from lowest to highest nodeID. For each node Z in {Ra, Rb, . . . Rn}, if Z is in the Cq, add X to Z's PHs. If Z is not in the Cq, append a node descriptor (Z,0, {X}) to the end of the Cq. The method 500 then goes to step 506. In embodiments where the node descriptors stored in the Cq include the fourth value, W, prior to going to step 506, new node descriptors added to the Cq in step 518 are given an initial value of W=0, and for any node descriptor in the Cq having W=1 and having X added to its PHs, W is reset to 0.

As described for the method 100 and the method 300, in other embodiments of the method 500, R0 is selected as the network node having the highest nodeID, the Cq is initialized in step 504 with nodes ordered from highest to lowest nodeID, and nodes added to the Cq in step 518 are ordered from highest to lowest nodeID before being added to the Cq. In still other embodiments, other suitable criteria for selecting R0 and ordering nodes before addition to the Cq may be used to provide a breadth-first process for computing the FT in the method 500.

In step 520, the sub-process 500*b* begins for ensuring that all nodes in the FT have at least two links in the FT. In step 520, the first node (Q) in the FT that has a D=1 and the lowest nodeID if two or more nodes have their D=1 is found. If a determination is made that no node Q exists in the FT, then the FT is a complete FT and in step 522, the method 500 causes the FT to be sent to a component of a router in the network and the method 500 ends.

If it is determined in step 520 that there is a node Q with D=1, then in step 524 all nodes that are coupled in the NT to Q are collected in a set {Ra, Rb, . . . Rn}. In step 526, a node (L) is found in {Ra, Rb, . . . Rn}, where L has (i) the lowest value of D, (ii) the lowest nodeID if two or more nodes have the same lowest value of D, and (iii) if either L is a network node of the first type and its D is less than MaxD or L is a network node of the second type and its D is less than ConMaxD. If no such node L is found, the method 500 goes to step 508 to increment MaxD and start over. If a node L is found, then in step 528 the values of D for both nodes Q and L are incremented by 1 in the FT, the link between Q and L is added in the FT through adding L to Q's PHs and the method 500 goes to step 520.

FIGS. 6A-E present data structures and a network diagram illustrating first iterations of the method 500 of FIGS. 5A and 5B. In the first iterations of the method 500 of FIGS. 5A and 5B, the value of the MaxD is equal to 3. The constraint ConMaxD is set equal to 2 in FIGS. 6A-E.

Figure 6A:
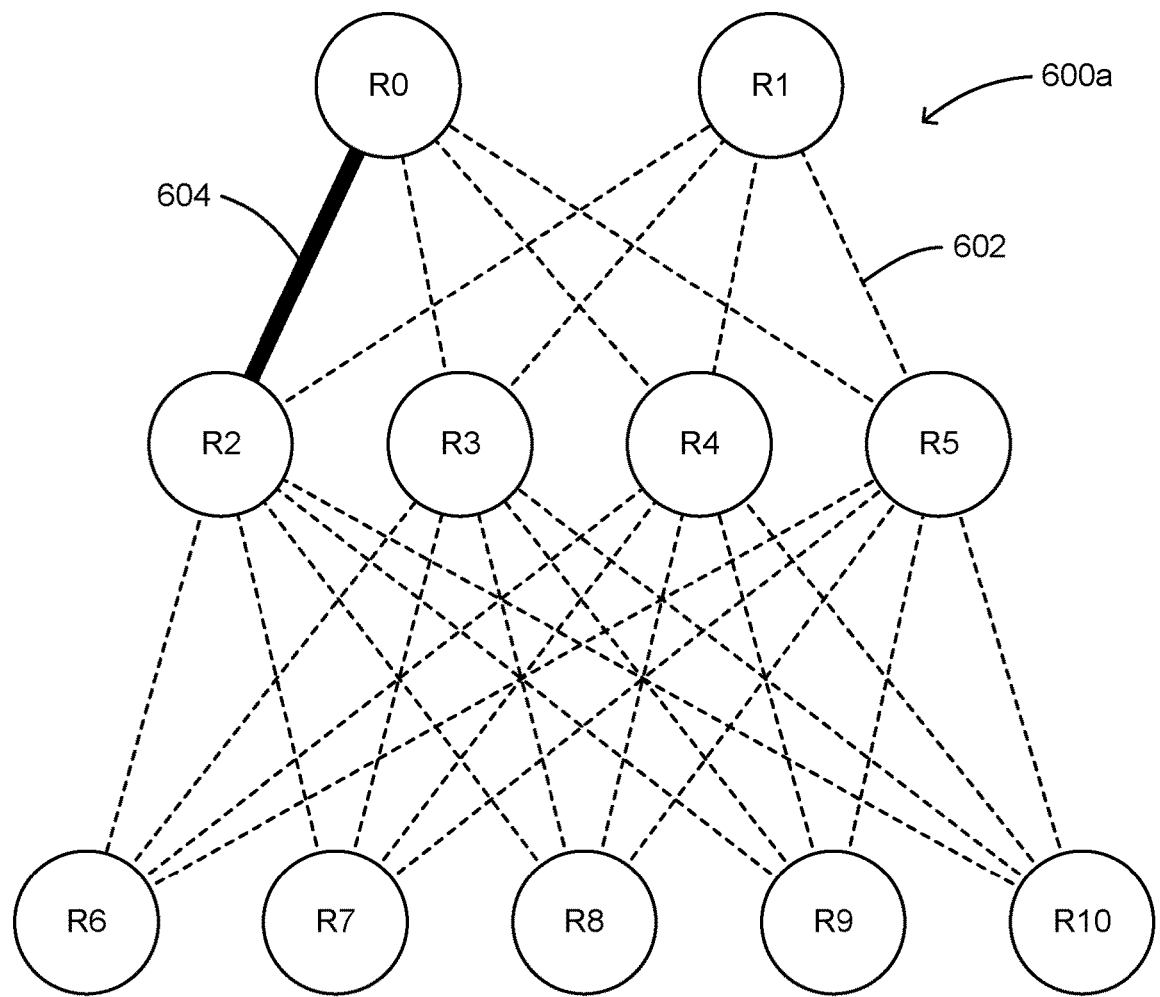
FIGS. 6A-E present data structures and a network diagram illustrating first iterations of the method of FIGS. 5A and 5B.

In FIG. 6A, a network diagram 600*a* graphically represents a status of the NT and the FT after a first iteration through the steps of the sub-process 500*a* of FIG. 5A. Dotted line 602 represents a link in the NT between nodes R1-R5. Other such dotted lines represent other links between nodes in the NT. Bold line 604 indicates that R2 has been added to the FT with R0 as its PH. Data structures 610 show that the iteration begins with the Cq={(R2,0, {R0}), (R3,0, {R0}), (R4,0, {R0}), (R5,0, {R0})}. In step 510, R2 is removed from the Cq and added to the FT. All nodes in the network are not in the FT and the Cq is not now empty, so in step 518, it is determined that nodes R1 and R6-R10 link to R2 and are not in the FT, so node descriptors for R1 and R6-R10 with PHs of {R2} are added to the Cq. As R2 is not linked to any of R3-R5, R2 is not added to the PHs for the nodes R3-R5 in the Cq. The results of step 518 are shown in data structure Cq'. The method 500 then goes to step 506 for a second iteration.

Figure 6B:
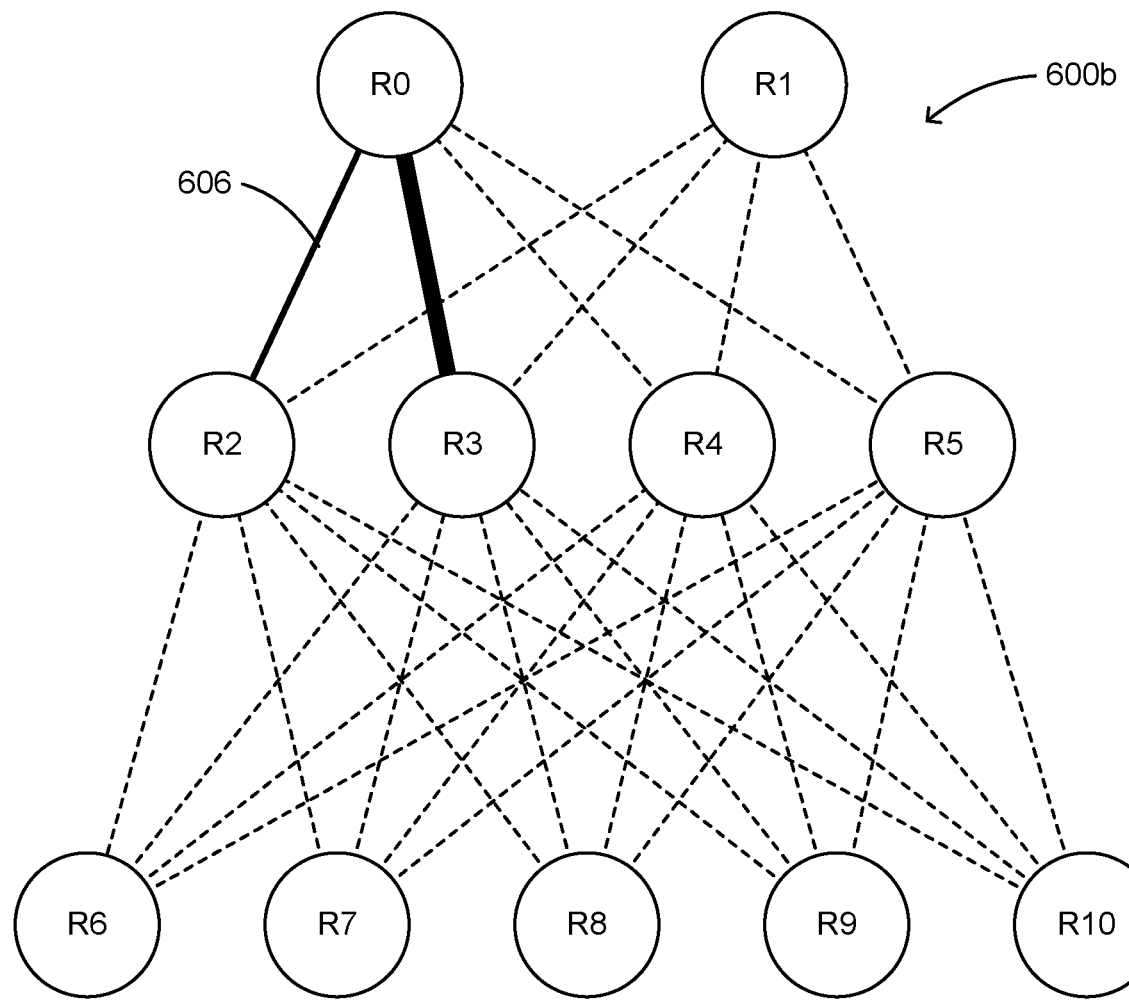

FIG. 6B shows the results of a second iteration of the steps of the sub-process 500*a*. In network diagram 600*b*, a solid line 606 shows that R2 is linked to R0 in the FT and a bold line indicates that R3 has been added to the FT with R0 as its PH. The data structures show that R3 has been removed from the Cq and added to FT, and R3 has been added to the PHs of each of R1 and R6-R10 in the Cq'.

Figure 6C:
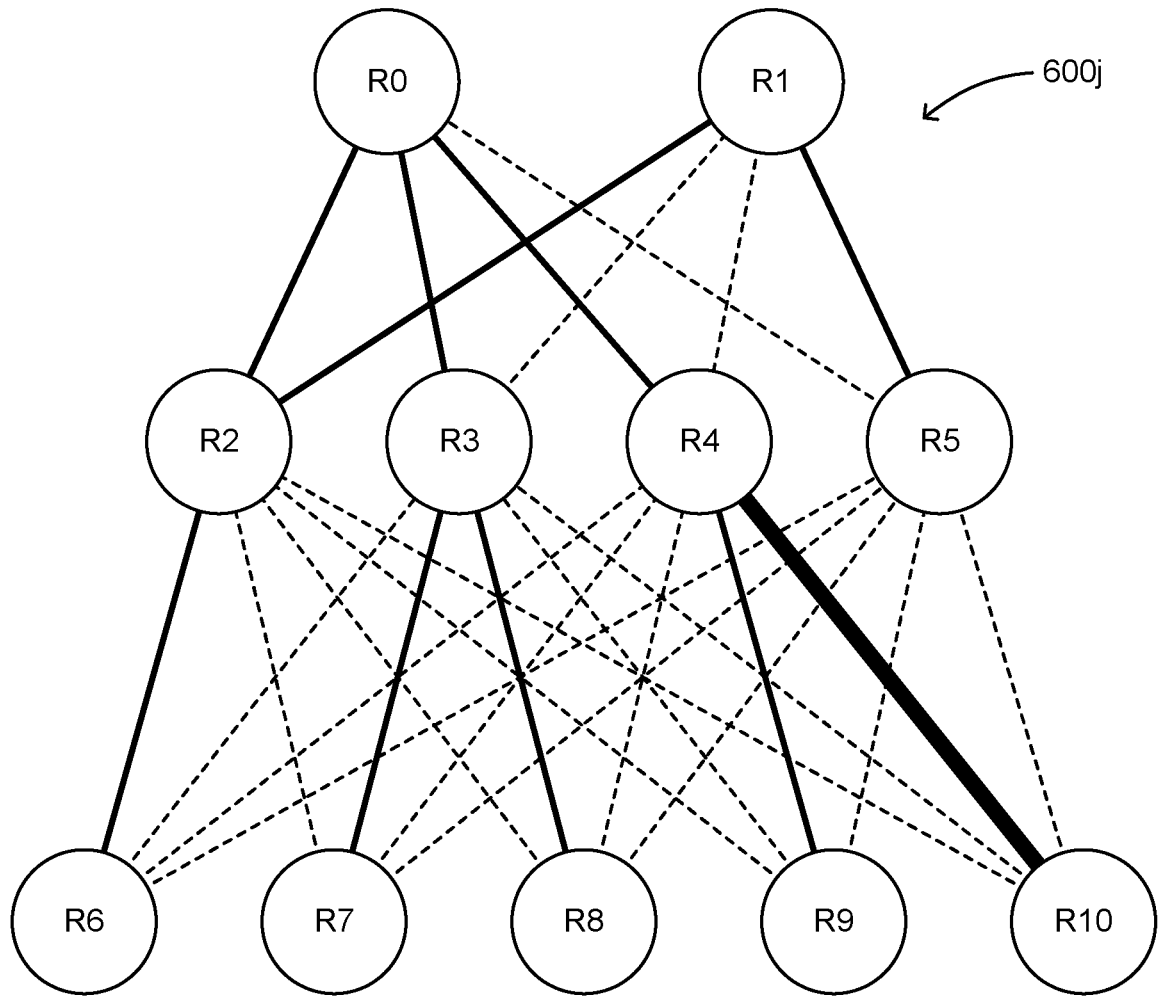

FIG. 6C shows the results of a tenth, and final, iteration of the steps of the sub-process 500*a*. In network diagram 600*j*, solid lines show that nodes R1-R9 have been added to the FT in previous iterations and a bold line indicates that R10 has been added to the FT in this iteration, with R4 as its PH. The data structures show that R10 has been removed from Cq and added to the FT. Step 512 determines that all nodes R0-R10 are in the FT and the method 500 continues with step 520.

Figure 6D:
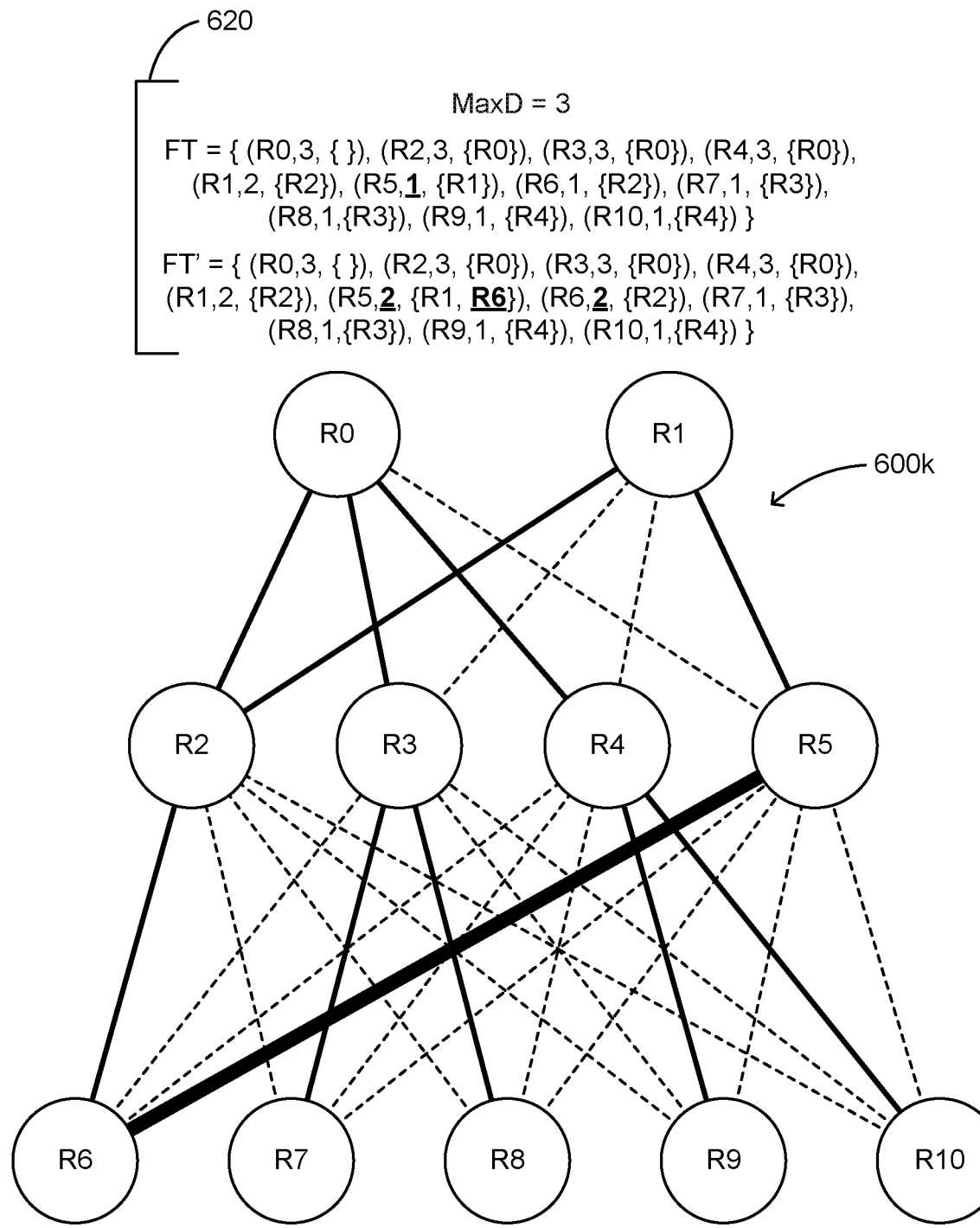

FIG. 6D shows the results of a first iteration through the steps of the sub-process 500*b* of FIG. 5B. Data structures 620 show that, in step 520, it is determined that node R5 has D=1 (data structure FT) and the lowest nodeID and, in step 526, it is determined that R6 is the node coupled to R5 with the lowest value of D, the lowest nodeID, and D<MaxD and D<ConMaxD. In step 528 the values of D for both R5 and R6 are incremented by 1 (data structure FT'), and the link between R5 and R6 is added in the FT' through adding R6 to R5's PHs. The network diagram 600*k* shows the link thereby established in the FT between nodes R5 and R6.

Figure 6E:
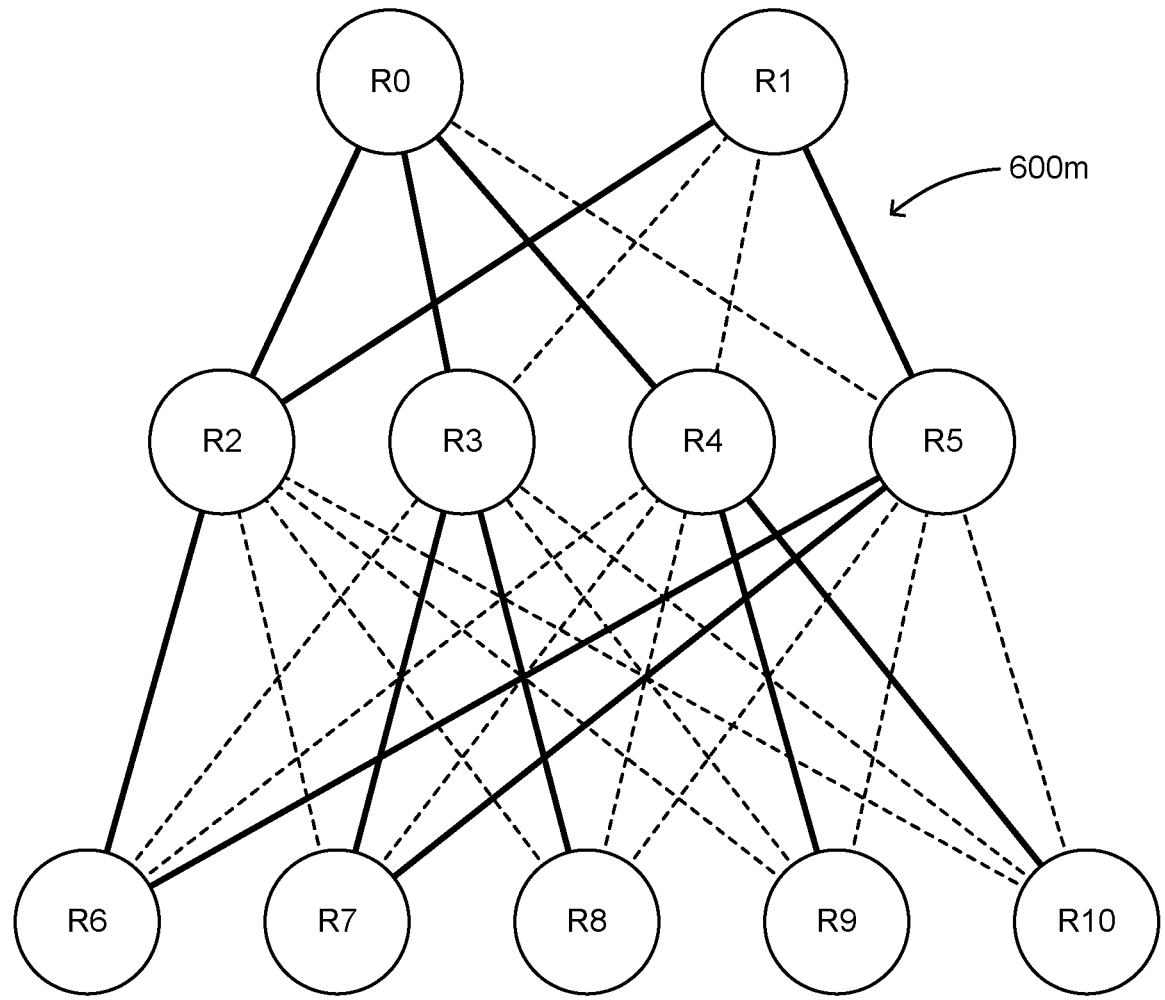

FIG. 6E shows the network diagram 600*m* that results from a third iteration through the steps of the sub-process 500*b*. In step 520, it is determined that node R8 has D=1 and the lowest nodeID but, in step 526, it is determined that there is no qualifying node coupled to R8, because each of nodes R2, R4 and R5 coupled to R8 already has D=MaxD. Thus, the method 500 goes to step 508 to increment the value of MaxD and restart the method 500 with step 504.

Figure 7A:
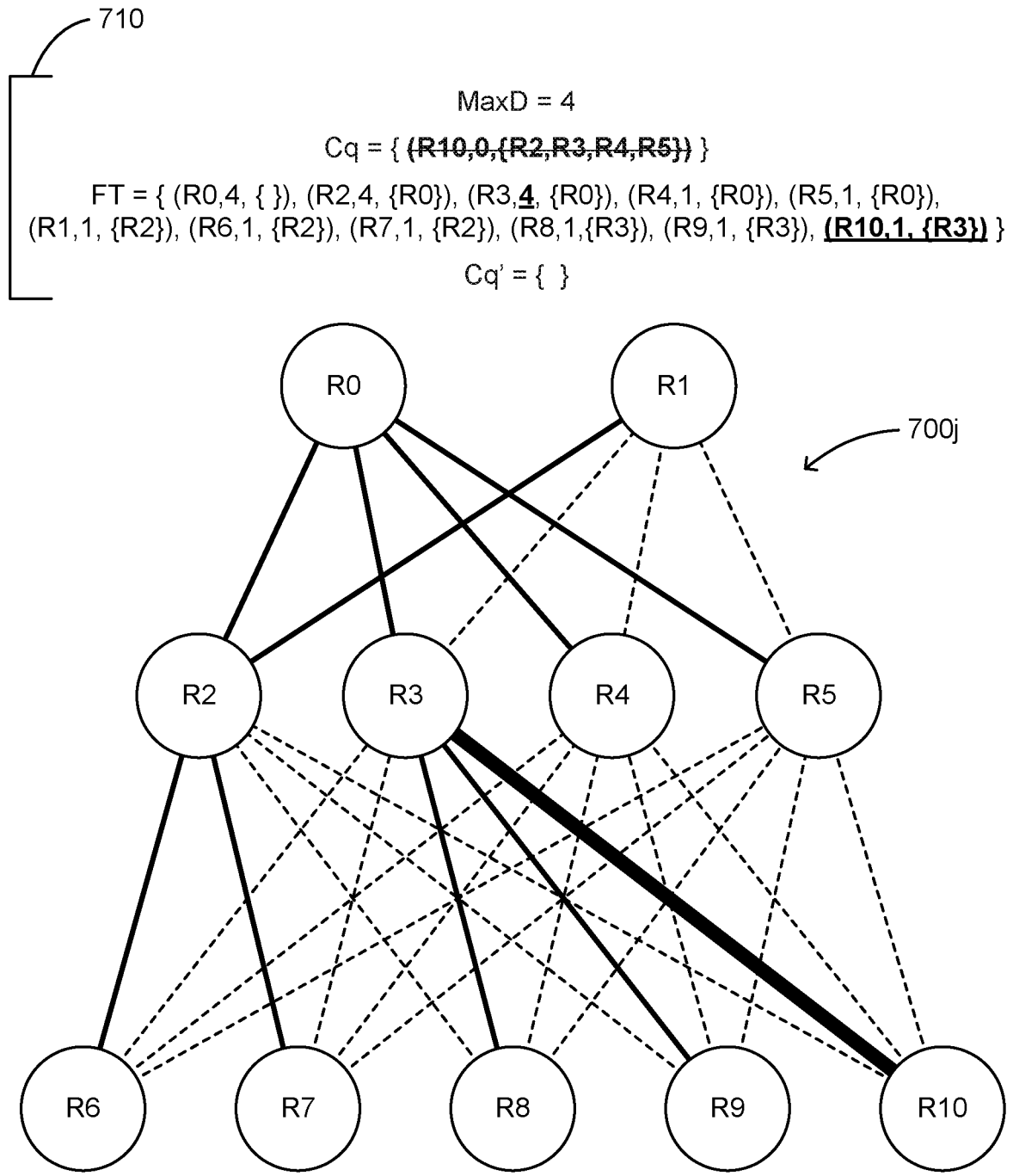
FIGS. 7A-C present data structures and a network diagram illustrating second iterations of the method of FIGS. 5A and 5B.
Figure 7B:
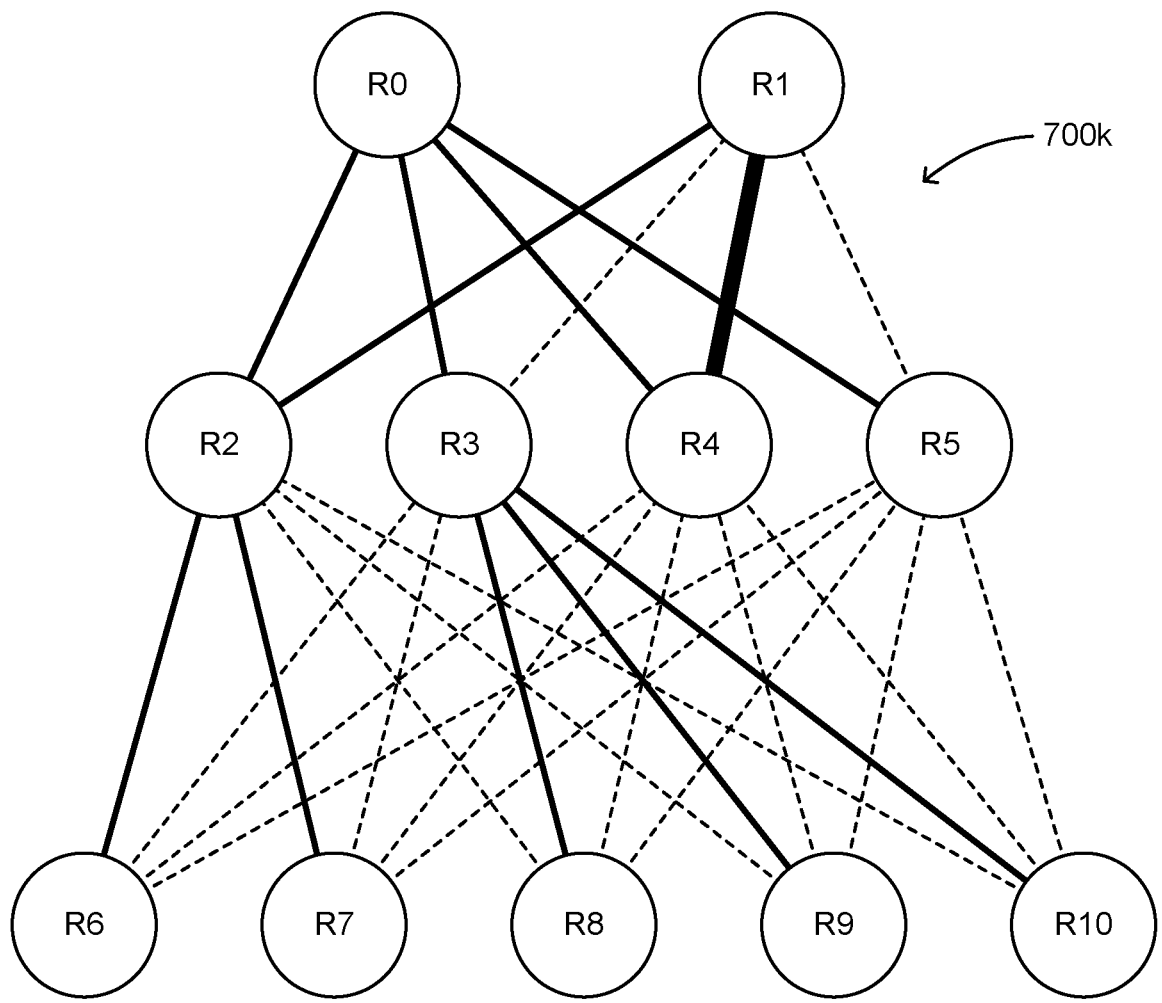
Figure 7C:
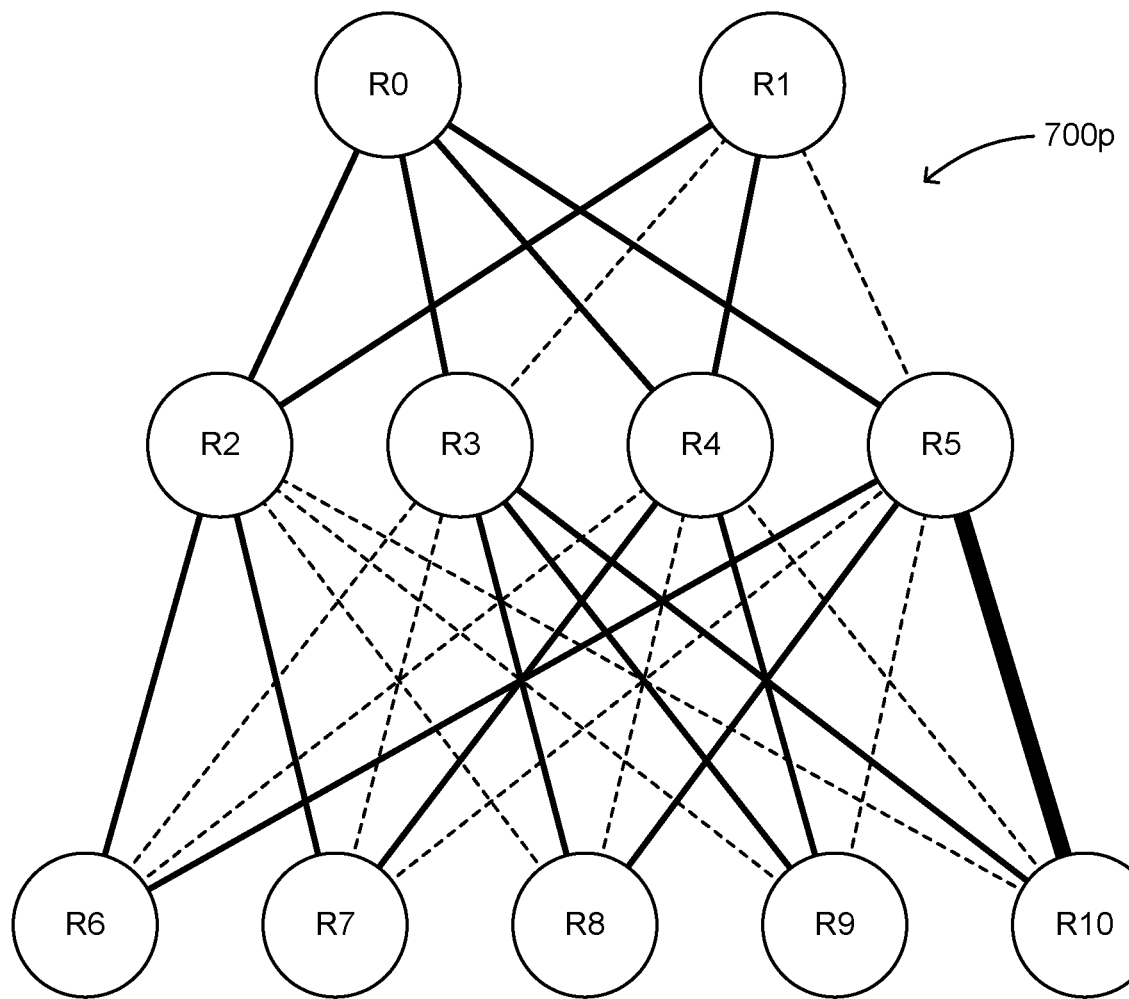

FIGS. 7A-C present data structures and a network diagram illustrating second iterations of the method 500 of FIGS. 5A and 5B. In the second iterations of the method 500 of FIGS. 5A and 5B, the value of the MaxD is equal to 4. The constraint ConMaxD remains equal to 2 in FIGS. 7A-C.

FIG. 7A shows the results of a tenth, and final, iteration of the steps of the sub-process 500*a* for MaxD=4. In network diagram 700*j*, solid lines show that nodes R1-R9 have been added to the FT in previous iterations (some having different PHs than in FIG. 6C) and a bold line indicates that R10 has been added to the FT in this iteration, with R3 as its PH. Data structures 710 show that R10 has been removed from the Cq and added to the FT. Step 512 determines that all nodes R0-R10 are in the FT and the method 500 continues with step 520.

FIG. 7B shows the results of a first iteration through the steps of the sub-process 500*b* of FIG. 5B for MaxD=4. Data structures 720 show that, in step 520, it is determined that node R1 has D=1 (data structure FT) and the lowest nodeID (each of R4 to R10 has D=1 but higher nodeID than R1) and, in step 526, it is determined that R4 is the node coupled to R1 with the lowest value of D, the lowest nodeID (R5 coupled to R1 has D=1 but higher nodeID than R4), and D<MaxD. In step 528 the values of D for both R1 and R4 are incremented by 1 (data structure FT'), and the link between R1 and R4 is added in the FT' through adding R4 to R1's PHs. The network diagram 700*k* shows the link thereby established in the FT between nodes R1 and R4.

FIG. 7C shows the results of a sixth iteration through the steps of the sub-process 500b for MaxD=4. The second through fifth iterations have added redundancy links to nodes R5-R9. In this iteration, in step 520 it is determined that node R10 has D=1 and, in step 526, it is determined that R5 is the node coupled to R10 with the lowest value of D in FT, and D<MaxD. In step 528 the values of D for both R5 and R10 are incremented by 1 (data structure FT'), the link between R10 and R5 is added to FT' by adding R5 to R10's PHs. The network diagram 700p shows the link thereby established in FT between nodes R10 and R5.

Figure 7D:
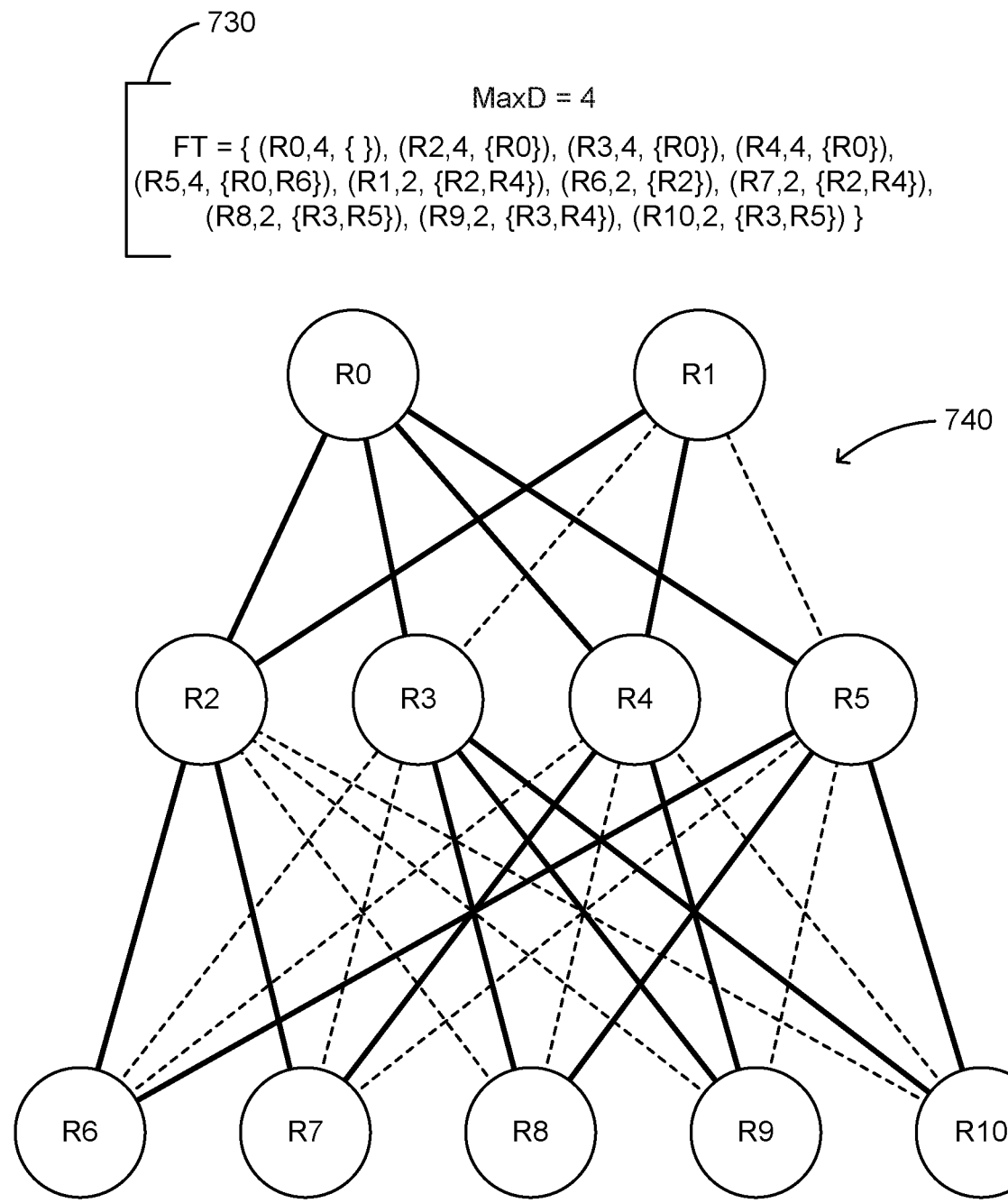
FIG. 7D presents a FT computed by the second iterations of the method of FIGS. 5A and 5B and a network diagram illustrating the FT.

On the next iteration of step 520, no node with D=1 is found in FT and, in step 522, the method 500 sends the FT to the component of the router in the network and terminates. FIG. 7D presents a FT 730 computed by the method 500 of FIGS. 5A and 5B with the MaxD equal to 4 and a network diagram 740 illustrating the FT.

Figure 8:
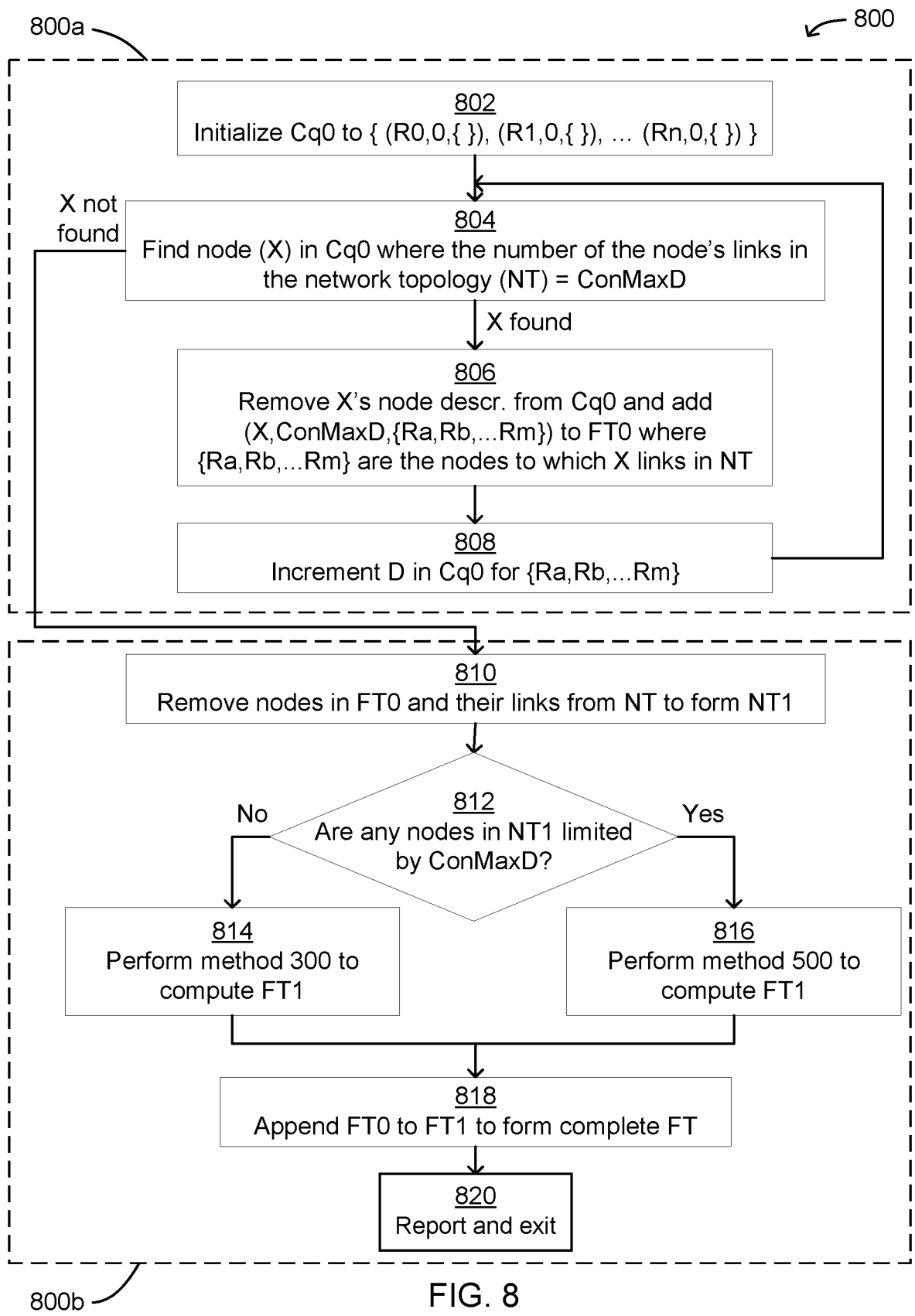
FIG. 8 presents a flow chart illustrating a fourth method according to an embodiment of the present disclosure for computing a FT.

FIG. 8 presents a flow chart illustrating a fourth method 800 according to an embodiment of the present disclosure for computing a FT. The fourth method 800 is used when the NT includes deterministic nodes. A node is a deterministic node if its D is constrained to ConMaxD and its number of links in the NT is equal to ConMaxD.

A sub-process 800a of the method 800 computes a flooding topology by first computing a FT0, which includes all deterministic nodes in the NT. Once all deterministic nodes have been added to the FT0 in sub-process 800a, a sub-process 800b of the method 800 computes a FT1, which includes all the nodes in the NT that are not in the FT0. Finally, the method 800 computes a complete FT by appending the FT0 to the end of the FT1.

In step 802, stored information is obtained (originally obtained from a network administrator) that identifies a subset of the nodes of the NT that have a constraint on their maximum degree in the FT. A value ConMaxD (Constrained Maximum Degree) is set to that constraint value. Also in step 802, the Cq0 is initialized to the set {(R0,0,{ }), (R1,0,{ }), ... (Rn,0,{ })}, where R0, R1, ... Rn are all the nodes in the NT. In step 804, a first deterministic node (X) in the Cq0 is found, where the number of links connected to node X is equal to ConMaxD and node X is in the subset. If no such node is found, the method 800 continues with step 810. If the node X is found, the method 800 continues with step 806.

In step 806, X's node descriptor is removed from the Cq0 and the nodes Ra, Rb, ... Rm are added to X's PHs, where Ra, Rb, ... Rm are nodes that link to X in the NT. Finally, X's node descriptor is added to the end of the FT0. In step 808, the value of D in the Cq0 for each of the nodes Ra, Rb, ... Rm is incremented by 1, and the method 800 goes to step 804.

In step 810, a temporary network topology NT1 is created by removing all nodes in the FT0 and their links to other nodes from the NT. In step 812, it is determined whether any nodes in the NT1 are limited to ConMaxD. If it is determined that no nodes limited to ConMaxD remain in the NT1, then the method 800 proceeds to step 814. If it is determined that nodes limited to ConMaxD do remain in the NT1, then the method 800 proceeds to step 816.

In step 814, the method 800 performs the method 300 on the NT1 to compute the FT1. In step 302 of the method 300, the MaxD is initialized to 1 plus the highest value of D in the Cq0. In step 304 of the method 300, the root node R0 is selected from the NT1 as the node with the lowest or highest nodeID, as discussed in the description of the method 300. When a node is added to FT in step 310 of the method 300, the initial value of D for the added node is set equal to the node's value of D in the Cq0. In step 322 of the method 300, rather than sending the FT1 to a component of a router in the network, the FT1 computed by the method 300 is returned to step 814 of the method 800.

In step 816, the method 800 performs the method 500 on the NT1 to compute the FT1. In step 502 of the method 500, MaxD is initialized to 1 plus the highest value of D in the Cq0 and ConMaxD is left unchanged for any nodes in the NT1 that are limited by ConMaxD. In step 504 of the method 500, the root node R0 is selected from the NT1 as the node with the lowest or highest nodeID, as discussed in the description of the method 500. When a node is added to FT in step 510 of the method 500, the initial value of D for the added node is set equal to the node's value of D in the Cq0. In step 522 of the method 500, rather than sending the FT1 to a component of a router in a network, the FT1 computed by the method 500 is returned to step 816 of the method 800.

In step 818, the FT0 is appended to the end of the FT1 to form the complete FT for the NT. In step 820, the method 800 causes the complete FT to be sent to a component of a router in the network and the method 800 ends.

Figure 9:
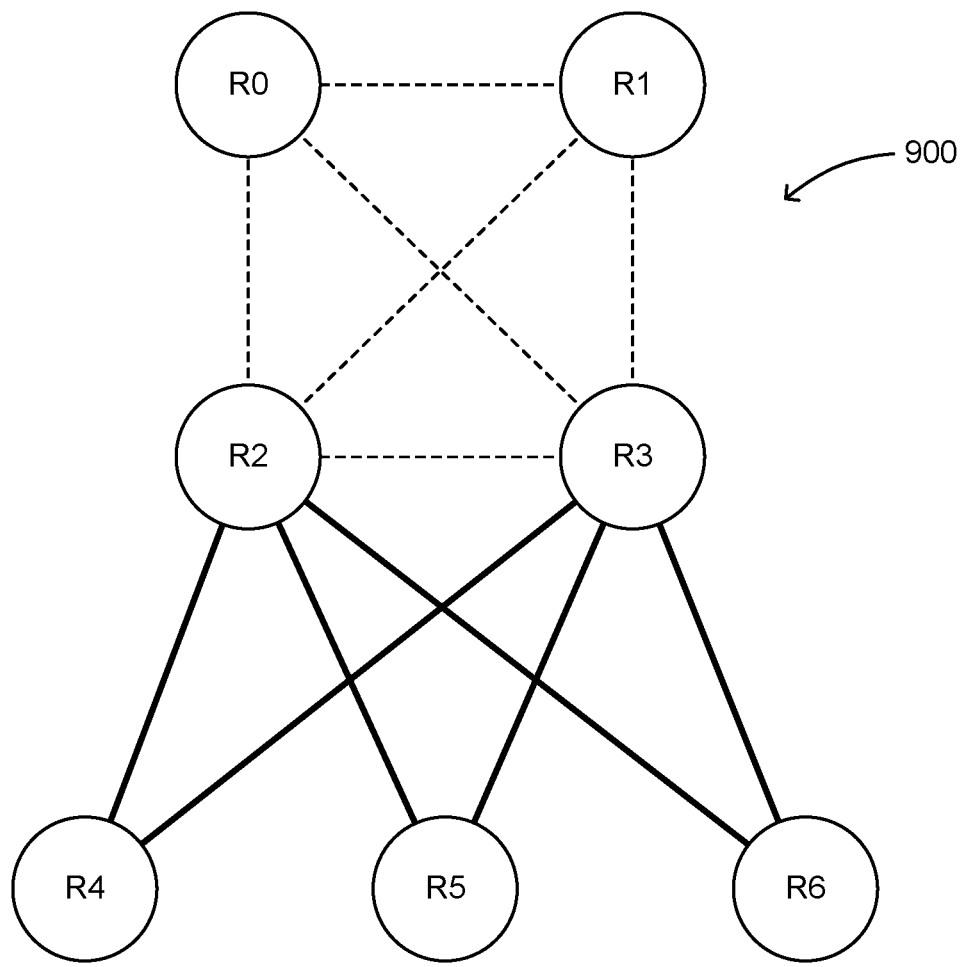
FIG. 9 presents data structures and a network diagram illustrating the operation of a first portion of the method of FIG. 8.

FIG. 9 presents data structures 910 and a network diagram 900 illustrating the operation of a first portion of the method 800 of FIG. 8. FIG. 9 presents an example of the operation of sub-process 800a on the network 900. In step 802, the Cq0 is initialized to {(R0,0,{ }), (R1,0,{ }), (R2,0,{ }), (R3,0,{ }), (R4,0,{ }), (R5,0,{ }), (R6,0,{ })}. Nodes R4-R6 have D limited to the ConMaxD, where the ConMaxD=2. Because nodes R4-R6 have only two links each, they are deterministic nodes.

After three iterations of steps 804, 806, and 808, the nodes R4, R5, and R6 have been removed from the Cq0 and added to the FT0 which now equals {(R4,2, {R2,R3}), (R5,2, {R2,R3}), (R6,2, {R2,R3})}. When step 804 finds no remaining deterministic nodes in the Cq0, the final value of the Cq0 is {(R0,0,{ }), (R1,0,{ }), (R2,3, { }), (R3,3,{ })} (data structure Cq0'). Note that each of the nodes R2 and R3 have D=3 in the Cq0, as each is linked in the FT0 to all three of the nodes R4, R5, and R6.

Figure 10A:
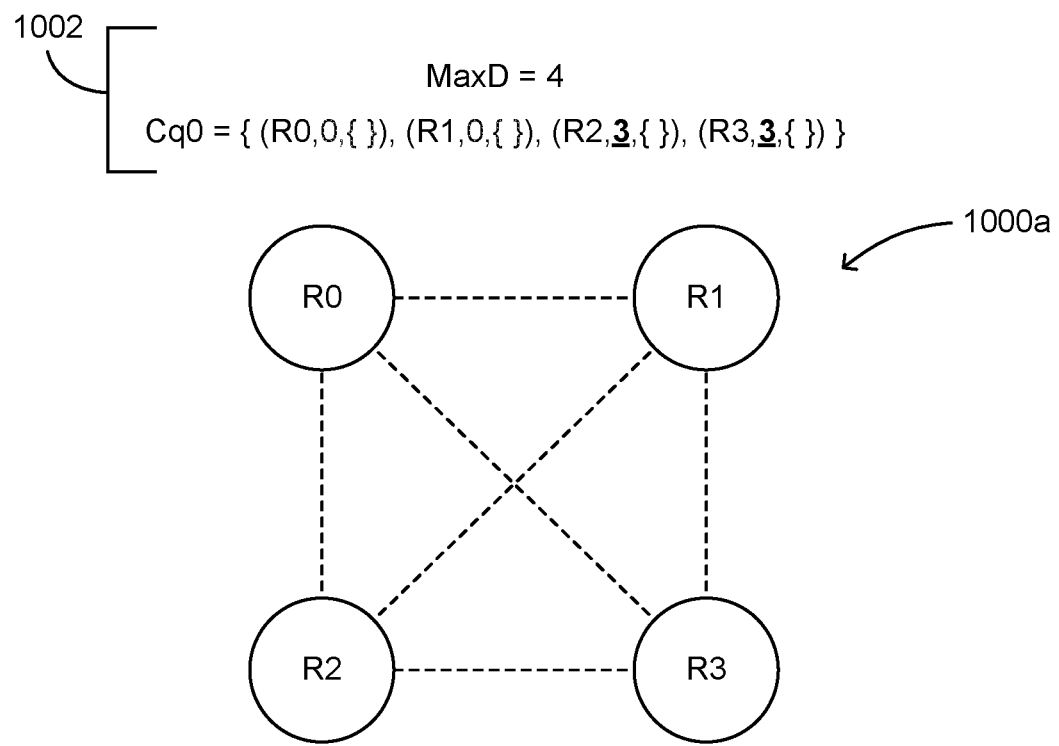
FIGS. 10A-B and 11A-B present data structures and network diagrams illustrating the operation of a second portion of the method of FIG. 8.

FIGS. 10A-B and 11A-B present data structures and network diagrams illustrating the operation of a second portion of the method 800 of FIG. 8. In step 810, the nodes R4, R5, and R6 and their links to other nodes are removed from the NT to create the NT1, which is shown in FIG. 10A as a network diagram 1000a. Step 812 determines that none of the remaining nodes in the NT1 (R0-R3) is limited to ConMaxD, so the method 800 proceeds to step 814 to perform the method 300 on the NT1 to compute the FT1. The data structures 1002 of FIG. 10A indicate that, since the highest value of D in the Cq0 is 3, MaxD is initialized in step 302 of the method 300 to MaxD=4. Also, when nodes R0-R3 are added to the FT in step 310 of the method 300, R0 and R1 will have initial values of D=1, and R2 and R3 will have initial values of D=3.

Figure 10B:
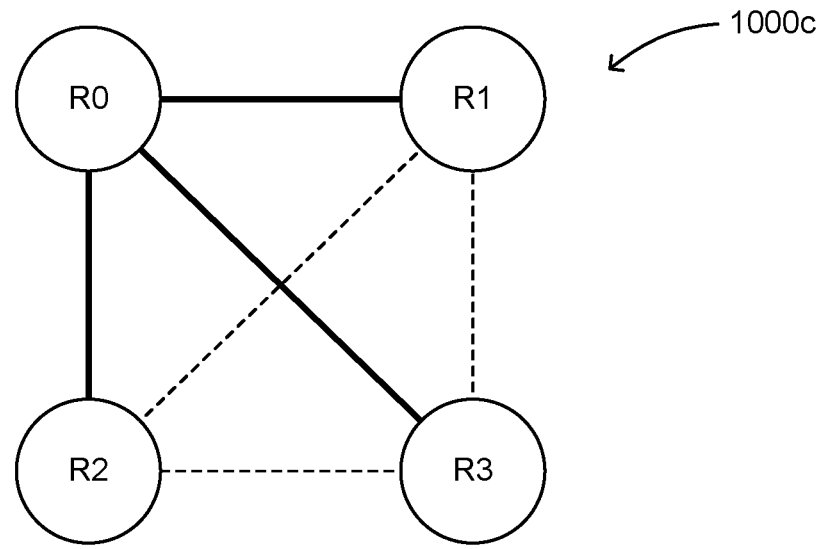

FIG. 10B shows in data structures 1020 and network diagram 1000c that the result of performing the sub-process 300a of the method 300 is the FT1={(R0,3,{ }), (R1,1, {R0}), (R2,4, {R0}), (R3,4, {R0})}. However, on the first pass through sub-process 300b, node R1 is identified as having D=1, but cannot be linked in the FT1 to either R2 or R3, because they each have D=MaxD, as shown in the data structures 1020.

Figure 11A:
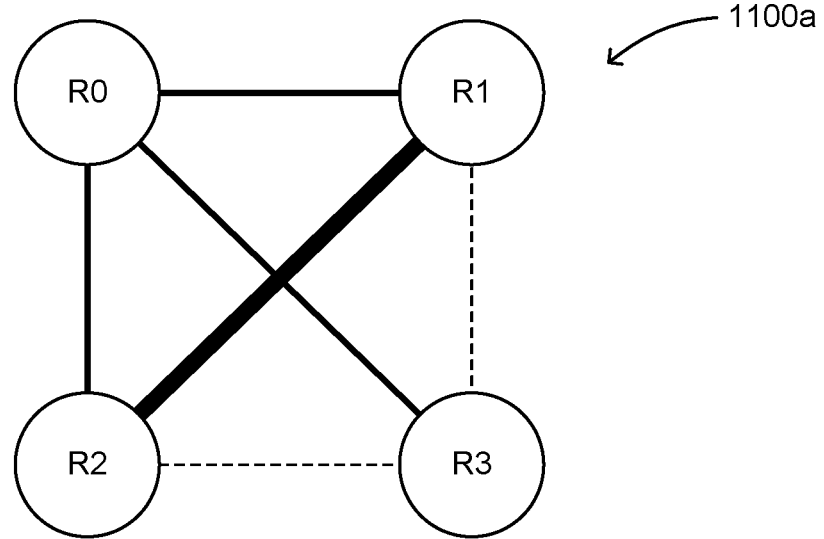
Figure 11B:
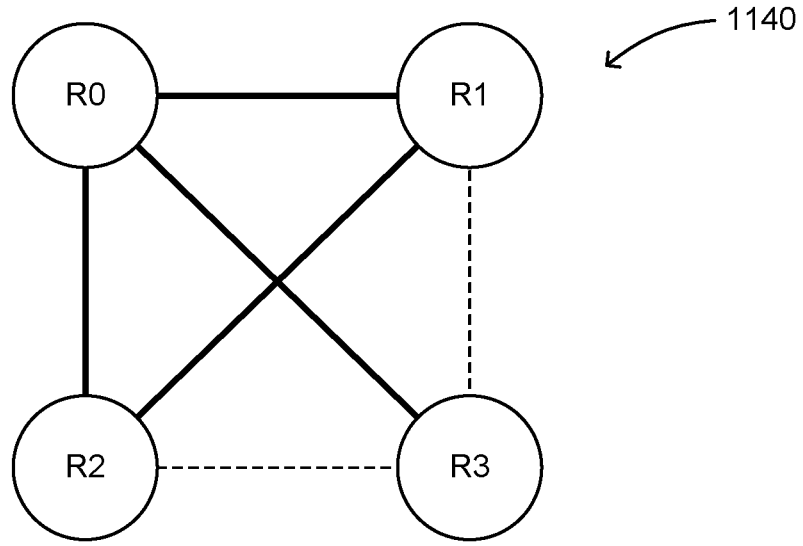

Therefore, the method 300 goes to step 308, increments the MaxD to the value 5, and repeats the sub-process 300a. The result is the same FT 1000c shown in FIG. 10B. However, FIG. 11A shows in data structures 1120 and network diagram 1100a that step 328 of the method 300 can now link R1 to R2, as R2's value of D in the FT1 is less than the MaxD. FIG. 11B shows in the data structures 1130 the resulting FT1={(R0,3, { }), (R1,2, {R0, R2}), (R2,5, {R0}), (R3,4, {R0})}, illustrated in network diagram 1140. The FT1 computed by the method 300 is returned to step 818 of the method 800.

Figure 12:
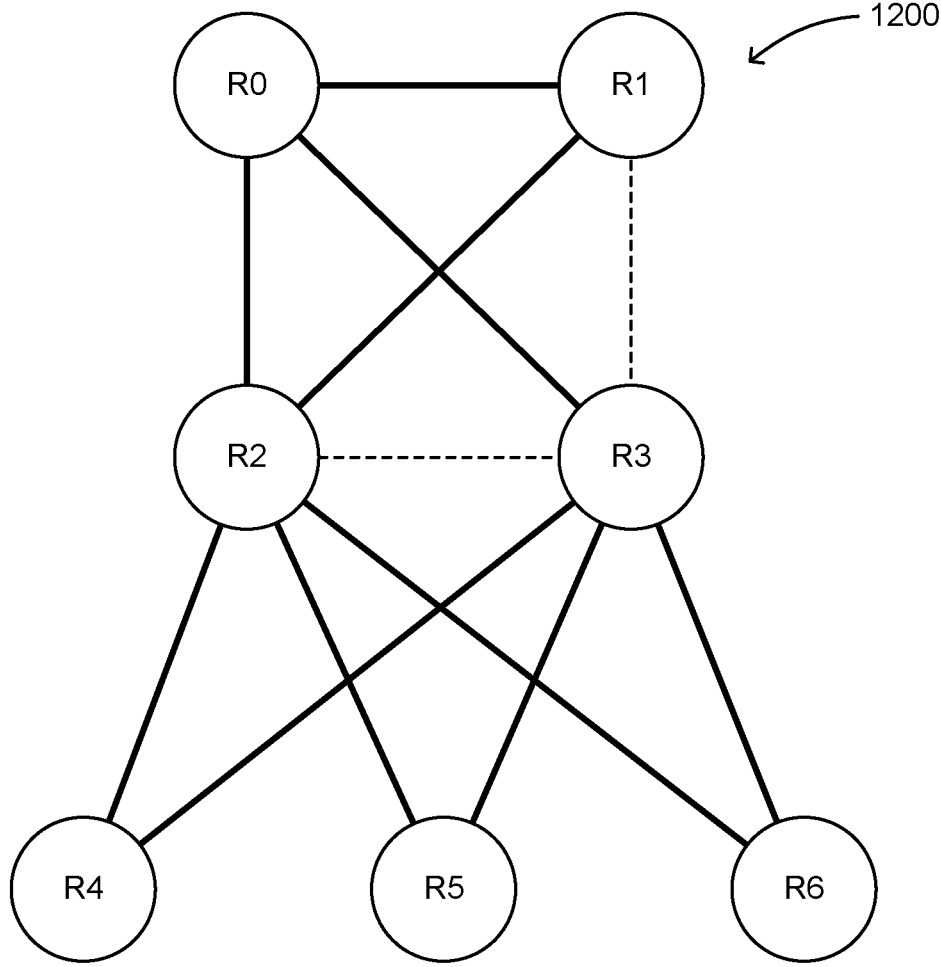
FIG. 12 presents a FT computed by the method of FIG. 8 and a network diagram illustrating the FT.

FIG. 12 presents a complete FT 1210 computed by the method 800 of FIG. 8 and a network diagram 1200 illustrating the complete FT. The data structure 1210 shows that the complete FT for the NT is the FT={(R0,3,{ }), (R1,2, {R0, R2}), (R2,5, {R0}), (R3,4, {R0}), (R4,2, {R2,R3}), (R5,2, {R2,R3}), (R6,2, {R2,R3})}, as illustrated in the network diagram 1200, which includes all nodes and links in the NT.

Figure 13:
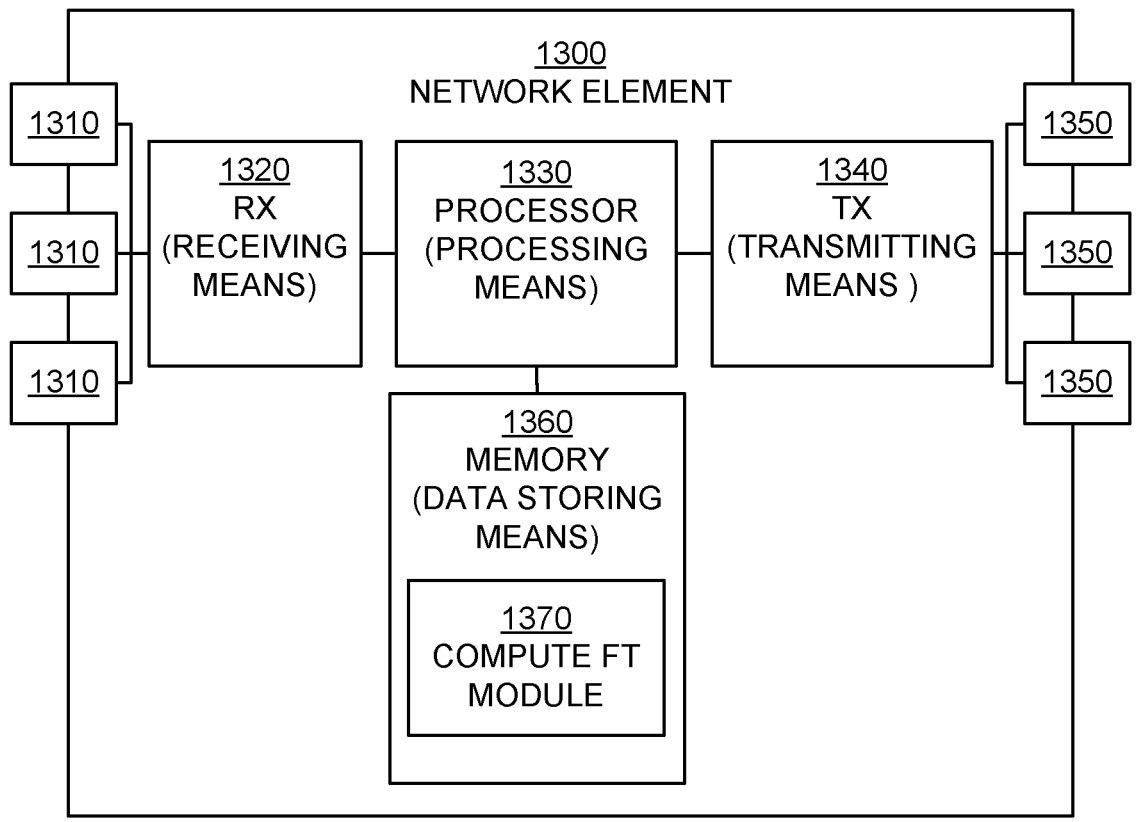
FIG. 13 is a schematic diagram illustrating a network element according to an embodiment of the present disclosure.

FIG. 13 is a schematic diagram illustrating a network element 1300 according to an embodiment of the present disclosure. The network element 1300 can be any network node such as, but not limited to, any router, switch, and controller, which are used by service providers around the world. The network element 1300 may also be referred to as a network device. The network element 1300 includes receiver units (RX) 1320 or receiving means for receiving data via ingress ports 1310. The network element 1300 also includes transmitter units (TX) 1340 or transmitting means for transmitting via data egress ports 1350.

The network element 1300 includes a memory 1360 or data storing means for storing the instructions and various data. The memory 1360 can be any type of or combination of memory components capable of storing data and/or instructions. For example, the memory 1360 can include volatile and/or non-volatile memory such as read-only memory (ROM), random access memory (RAM), ternary content-addressable memory (TCAM), and/or static random-access memory (SRAM). The memory 1360 can also include one or more disks, tape drives, and solid-state drives. In some embodiments, the memory 1360 can be used as an over-flow data storage device to store programs when such programs are selected for execution, and to store instructions and data that are read during program execution.

The network element 1300 has one or more processor(s) 1330 or other processing means (e.g., central processing unit (CPU)) to process instructions. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is communicatively coupled via a system bus with the ingress ports 1310, RX 1320, TX 1340, egress ports 1350, and memory 1360. The processor 1330 can be configured to execute instructions stored in the memory 1360. Thus, the processor 1330 provides a means for performing any computational, comparison, determination, initiation, configuration, or any other action corresponding to the claims when the appropriate instruction is executed by the processor. In some embodiments, the memory 1360 can be memory that is integrated with the processor 1330.

In one embodiment, the memory 1360 stores a FT computation module 1370. The FT computation module 1370 includes data and executable instructions for implementing the disclosed embodiments. For instance, the FT computation module 1370 can include instructions for implementing the methods described in FIGS. 1, 3A-C, 5A-B, 8, and 16A-B. The inclusion of the FT computation module 1370 substantially improves the functionality of the network element 1300 by enabling simultaneous deterministic computation of a FT by multiple nodes of a network. A network element 1300 including a FT computation module 1370 implementing a first of the disclosed methods for computing a FT is a different system than a network element 1300 including a FT computation module 1370 implementing a second of the disclosed processes for computing a FT.

Figure 14:
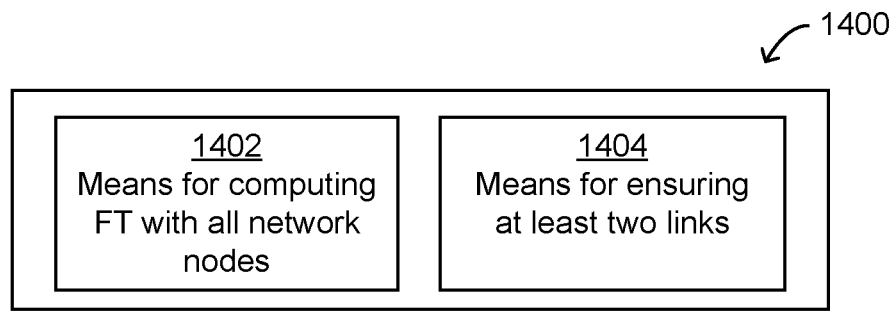
FIG. 14 illustrates a first apparatus configured to implement one or more of the methods described herein for computing a FT.
Figure 16A:
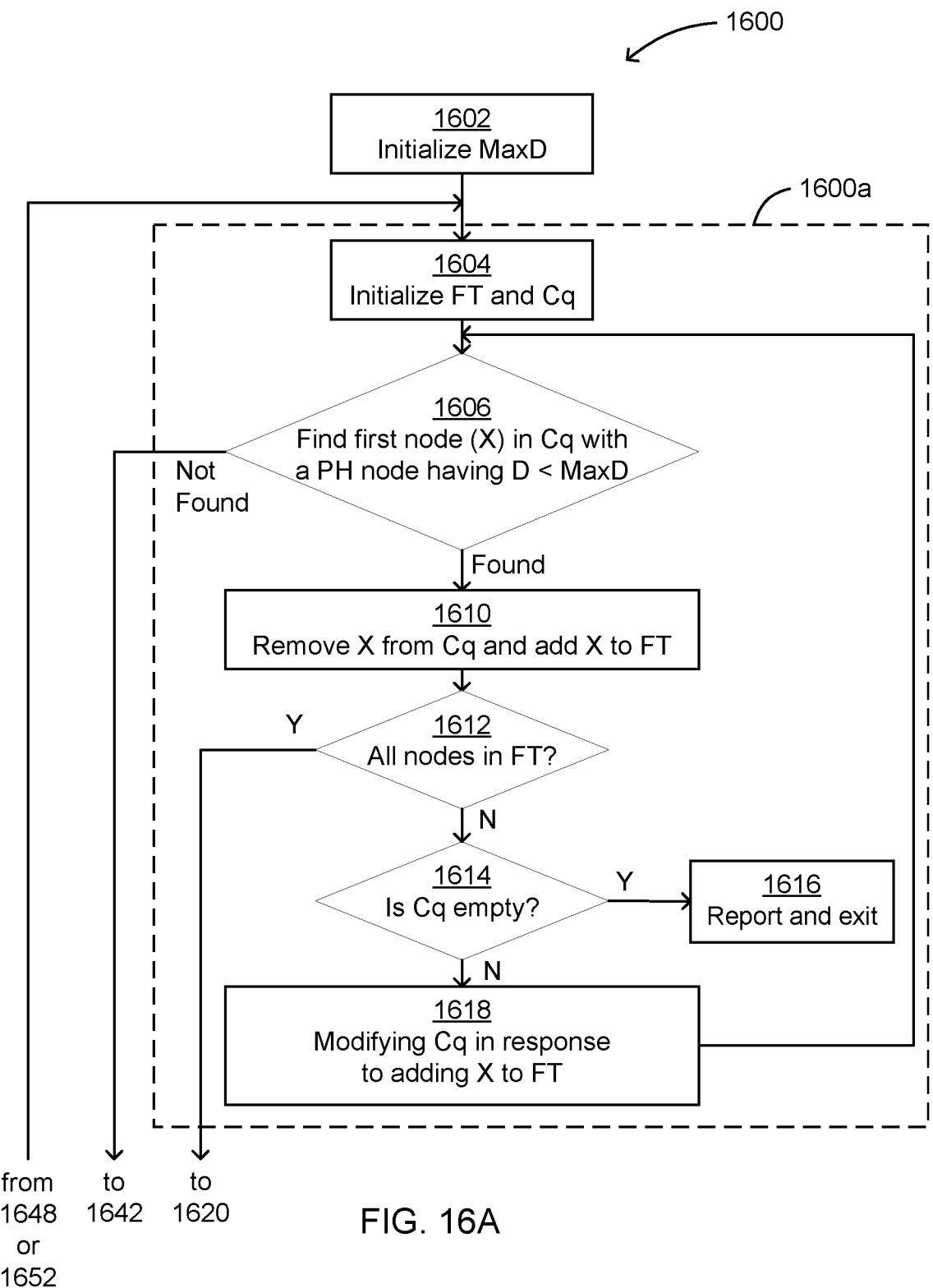
FIGS. 16A and 16B present a flow chart illustrating a fifth method according to an embodiment of the present disclosure for computing a FT.
Figure 16B:
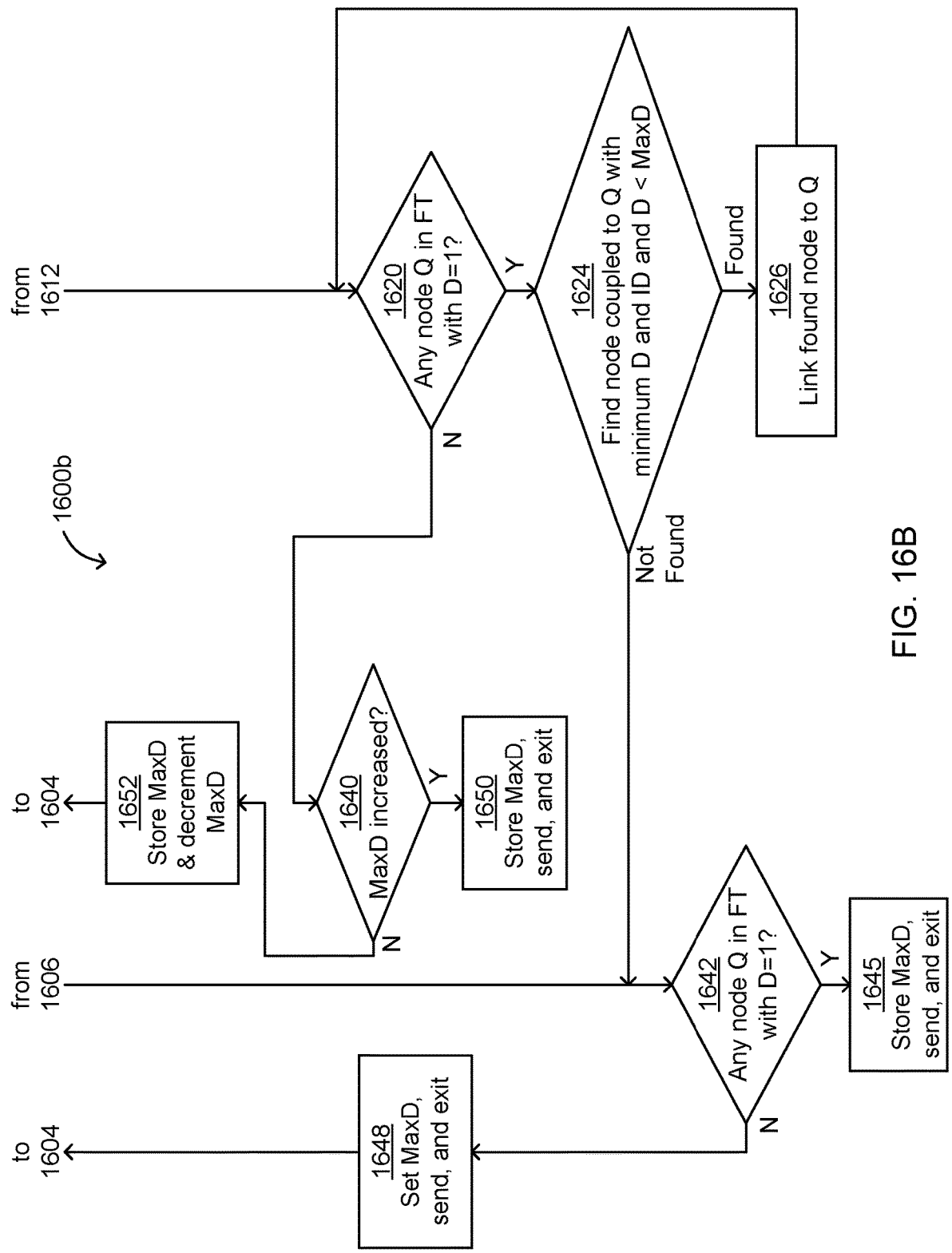

FIG. 14 illustrates a first apparatus 1400 configured to implement one or more of the methods described herein for computing a FT for a network, such as, for example, the process 100 of FIG. 1, the process 300 of FIGS. 3A-B, the process 500 of FIGS. 5A-B, and the process 1600 of FIGS. 16A-B. The first apparatus 1400 may be implemented in the network element 1300. The apparatus 1400 comprises means 1402 for computing a FT that includes all the nodes in the network, as described with reference to the sub-process 100a of FIG. 1, the sub-process 300a of FIG. 3A, the sub-process 500a of FIG. 5A, and the sub-process 1600a of FIG. 16A; and means 1404 for ensuring that all nodes in the FT have at least two links in the FT, as described with reference to the sub-process 100b of FIG. 1, the sub-process 300b of FIG. 3B, the sub-process 500b of FIG. 5B, and the sub-process 1600b of FIG. 16B.

Figure 15:
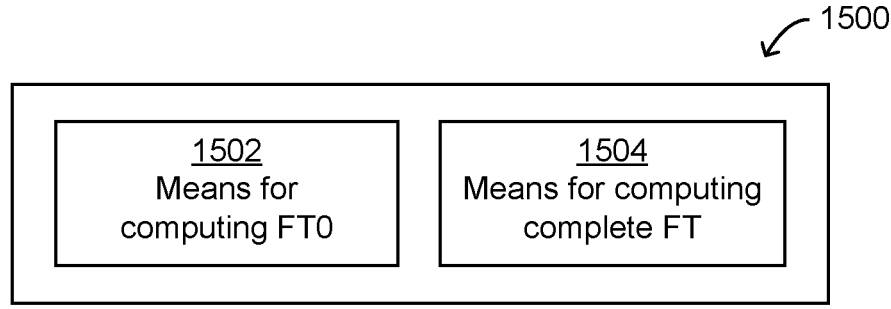
FIG. 15 illustrates a second apparatus configured to implement one or more of the methods described herein for computing a FT.

FIG. 15 illustrates a second apparatus 1500 configured to implement one or more of the methods described herein for computing a complete FT, such as, for example, the process 800 of FIG. 8. The second apparatus 1500 may be implemented in the network element 1300. The apparatus 1500 comprises means 1502 for computing a FT0 that includes all deterministic nodes in the network, as described with reference to the sub-process 800a of FIG. 8; and means 1504 for computing a complete FT by computing a FT1, which includes all the nodes in the network that are not in the FT0, and appending the FT0 to the FT1 to compute the complete FT, as described with reference to the sub-process 800b of FIG. 8.

FIGS. 16A and 16B present a flow chart illustrating a fifth method 1600 according to an embodiment of the present disclosure for computing a FT. The method 1600 is similar to the method 300, described with reference to FIGS. 3A and 3B. The method 300 starts with an estimated value for MaxD and increases the value as needed to successfully compute a FT for a network. In contrast, the method 1600 starts with a stored value for MaxD from a previous successful calculation of a FT for the network (or for a previous version of the network) and tries decreasing values of MaxD to find the smallest MaxD that will successfully compute a FT for the network.

The method 1600 includes a sub-process 1600a (shown in FIG. 16A) for computing a FT that includes all the nodes in the network and a sub-process 1600b (shown in FIG. 16B) for ensuring that all nodes in the FT have at least two links in the FT. Other than the differences described below, steps in the method 1600 perform identically to like-numbered steps in the method 300.

In step 1602, the variable MaxD is set to an initial value equal to a stored value for MaxD from a previous computed FT for the network. In step 1620, when it is determined that all nodes in the FT have more than one link in the FT (having previously determined in step 1612 that the FT includes all the nodes in the network), the method 1600 has successfully computed a FT for the current value of MaxD and goes to step 1640. In step 1640, if it is determined that the MaxD is increased, that is that the previous computation of FT is not successful, then the method 1600 goes to step 1645; otherwise, the method 1600 goes to step 1652. In step 1645, the value of MaxD is stored, the FT is then sent to a component of a router in the network and the method 1600 ends. In step 1652, the successful value of MaxD is stored, along with the successfully computed FT, the value of MaxD is decremented, and the method 1600 goes to step 1604 to re-run sub-processes 1600a and 1600b with the new value of MaxD.

If it is determined in either step 1606 that no further nodes can be added to the FT or in step 1624 that a second link cannot be added to a node, then the current value of MaxD is too low to successfully compute a FT and the method 1600 goes to step 1642. In step 1642, if it is determined that a value of MaxD and a FT previously computed is stored, the method 1600 goes to step 1645, otherwise the method 1600 goes to step 1648. In step 1645, the value of MaxD is set to the previously stored successful value of MaxD and the FT is set to the previously stored successfully computed FT. The FT is then sent to a component of a router in the network and the method 1600 ends. In step 1648, the value of MaxD is increased by 1 and then the method 1600 goes to step 1604 to re-run sub-processes 1600a and 1600b with the new value of MaxD.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A network device, comprising:
a memory configured to store instructions; and
a processor coupled to the memory and configured to execute the instructions stored in the memory to cause the network device to:
select a node R0 from a plurality of nodes;
initialize a flooding topology (FT) with the node R0;
initialize a candidate queue (Cq);
implement a first loop, wherein the network device:
removes a first node from the Cq and adding the first node to the FT;
determines whether the FT includes all nodes in the plurality of nodes;
terminates the first loop when the FT includes all the nodes in the plurality of nodes; and
appends to the Cq those nodes that are coupled in the plurality of nodes to the first node and are not in the FT when the FT does not include all the nodes in the plurality of nodes; and
adds a link to any node in the FT having only one link in the FT.

2. The network device of claim 1, wherein, in the first loop, the network device:

determines whether the Cq is empty when the FT does not include all the nodes in the plurality of nodes; and
when the Cq is empty and the FT does not include all the nodes in the plurality of nodes:
transmits a first message to an administrator of the plurality of nodes;
transmits a second message to a component in the network device, wherein the first and second messages indicate an existence of nodes in the plurality of nodes that are unconnected to other nodes of the plurality of nodes; and
terminates the first loop.

3. The network device of claim 1, wherein, in adding the link to any node in the FT having only one link in the FT, the network device:
implements a second loop, wherein the network device:
determines whether the FT includes a node Q having only one link in the FT;
terminates the second loop with all the nodes in the FT having more than one link in the FT when the FT does not include the node Q; and
when the FT does include the node Q:
creates a set of all nodes that are coupled in the plurality of nodes to the node Q;
selects a node L in the set, the node L having (i) a lowest number of links in the FT, and (ii) a lowest nodeID when two or more nodes have the same lowest number of links in the FT, where nodeID is an identifier of the node L in a topology of the plurality of nodes;
increments by 1 a degree of the node Q in the FT;
increments by 1 the degree of the node L in the FT; and
adds a link between Q and L to the FT.

4. The network device of claim 1, wherein the node R0 has a lowest nodeID in the plurality of nodes.

5. The network device of claim 1, wherein the Cq is initialized with nodes ordered from lowest nodeID to highest nodeID.

6. The network device claim 1, wherein nodes appended to the Cq are ordered from lowest nodeID to highest nodeID.

7. A network device, comprising:
a memory configured to store instructions; and
a processor coupled to the memory and configured to execute the instructions stored in the memory to cause the network device to:
set an initial value for a maximum degree (MaxD);
implement a first loop, wherein the network device:
selects a node R0 from a plurality of nodes;
initializes a flooding topology (FT) with the node R0;
adds nodes from the plurality of nodes to the FT;
determines whether the FT includes all nodes in the plurality of nodes;
increments the value of the MaxD; and
repeats the steps of the first loop until the FT includes all the nodes in the plurality of nodes; and
implements a second loop when the FT includes all the nodes in the plurality of nodes, wherein the network device:
adds a link to any node in the FT having only one link in the FT and coupled in the plurality of nodes to a node having a number of links less than MaxD;
determines whether all the nodes in the FT have more than one link in the FT; and
increments the value of the MaxD: and
repeats the first loop and the second loop until all the nodes in the FT have more than one link in the FT.

8. The network device of claim 7, wherein, in adding the nodes from the plurality of nodes to the FT, the network device:
  initializes a candidate queue (Cq) to include all nodes that are coupled in the plurality of nodes to the node R0, the nodes being ordered in the Cq by a nodeID of each node, where nodeID is an identifier of the node in a topology of the plurality of nodes; and
  implements a third loop, wherein the network device:
    determines whether the Cq includes a node X, the node X being a first node in the Cq having a node Y in a Previous Hops (PHs) of the node X, the node Y having a degree less than MaxD;
    terminates the third loop with the FT not including all the nodes in the plurality of nodes when the Cq does not include the node X;
    removes the node X from the Cq and adding the node X to the FT;
    determines whether the FT includes all the nodes in the plurality of nodes;
    modifies the Cq when the FT does not include all the nodes in the plurality of nodes; and
    terminates the third loop when the FT includes all the nodes in the plurality of nodes.

9. The network device of claim 8, wherein the Cq is initialized with nodes ordered from lowest nodeID to highest nodeID.

10. The network device of claim 8, wherein, in modifying the Cq when the FT does not include all the nodes in the plurality of nodes, the network device:
  creates a queue of all nodes that are coupled in the plurality of nodes to the node X and are not in the FT, the queue ordered by the nodeID of the nodes in the queue; and
  for each node Z in the queue:
    determines whether the node Z is in the Cq;
    adds the node X to the PHs of the node Z in the Cq when the node Z is in the Cq; and
    appends the node Z to the Cq when the node Z is not in the Cq.

11. The network device of claim 10, wherein nodes appended to the Cq are ordered from lowest nodeID to highest nodeID.

12. The network device of claim 7, wherein, in adding the link to any node in the FT having only one link in the FT and coupled in the plurality of nodes to the node having a number of links less than MaxD, the network device:
  implements a fourth loop, wherein the network device:
    determines whether the FT includes a node Q having only one link in the FT;
    terminates the fourth loop with all the nodes in the FT having more than one link in the FT when the FT does not include the node Q;
    determines whether the FT includes a node L coupled to Q in the plurality of nodes, the node L having (i) a lowest number of links in the FT, (ii) a lowest nodeID when two or more nodes have the same lowest number of links in the FT, and (iii) the degree less than MaxD, when the FT does include the node Q;
    when the FT does include the node L:
      increments by 1 the degree of the node Q in the FT;
      increments by 1 the degree of the node L in the FT; and
      adds the node L to the PHs of the node Q in the FT; and
    terminates the fourth loop without all the nodes in the FT having more than one link in the FT when the FT does not include the node L.

13. The network device of claim 7, wherein the node R0 has a lowest nodeID in the plurality of nodes.

14. A method for computing a flooding topology (FT) in a network device, comprising:
  selecting a node R0 from a plurality of nodes;
  initializing the FT with the node R0;
  initializing a candidate queue (Cq);
  implementing a first loop of the method, comprising:
    removing a first node from the Cq and adding the first node to the FT;
    determining whether the FT includes all nodes in the plurality of nodes;
    terminating the first loop when the FT includes all the nodes in the plurality of nodes; and
    appending to the Cq those nodes that are coupled in the plurality of nodes to the first node and are not in the FT when the FT does not include all the nodes in the plurality of nodes; and
  adding a link to any node in the FT having only one link in the FT.

15. The method of claim 14, wherein the first loop of the method further comprises:
  determining whether the Cq is empty when the FT does not include all the nodes in the plurality of nodes; and
  when the Cq is empty:
    transmitting a first message to an administrator of the plurality of nodes;
    transmitting a second message to a component in the network device, the first and second messages indicating an existence of nodes in the plurality of nodes that are unconnected to other nodes of the plurality of nodes; and
    terminating the method of claim 1.

16. The method of claim 14, wherein adding the link to any node in the FT having only one link in the FT comprises:
  implementing a second loop of the method, comprising:
    determining whether the FT includes a node Q having only one link in the FT;
    terminating the second loop with all the nodes in the FT having more than one link in the FT when the FT does not include the node Q; and
    when the FT does include the node Q:
      creating a set of all nodes that are coupled in the plurality of nodes to the node Q;
      selecting a node L in the set, the node L having (i) a lowest number of links in the FT, and (ii) a lowest nodeID when two or more nodes have the same lowest number of links in the FT, where nodeID is an identifier of the node L in a topology of the plurality of nodes;
      incrementing by 1 a degree of the node Q in the FT;
      incrementing by 1 the degree of the node L in the FT; and
      adding a link between Q and L to the FT.

17. The method of claim 14, wherein the node R0 has a lowest nodeID in the plurality of nodes.

18. The method of claim 14, wherein the Cq is initialized with nodes ordered from lowest nodeID to highest nodeID.

19. The method of claim 14, wherein nodes appended to the Cq are ordered from lowest nodeID to highest nodeID.

20. A method for computing a flooding topology (FT) in a network device, comprising:
  setting an initial value for a maximum degree (MaxD);
  implementing a first loop of the method, comprising:
  selecting a node R0 from a plurality of nodes;
  initializing the FT with the node R0;
  adding nodes from the plurality of nodes to the FT;
  determining whether the FT includes all nodes in the plurality of nodes; and incrementing the value of the MaxD and repeating the steps of the first loop until the FT includes all the nodes in the plurality of nodes; and implementing a second loop of the method when the FT includes all the nodes in the plurality of nodes, comprising:

adding a link to any node in the FT having only one link in the FT and coupled in the plurality of nodes to a node having a number of links less than MaxD;

determining whether all the nodes in the FT have more than one link in the FT; and incrementing the value of the MaxD and repeating the first loop and the second loop until all the nodes in the FT have more than one link in the FT.

21. The method of claim 20, wherein adding the nodes from the plurality of nodes to the FT comprises:

initializing a candidate queue (Cq) to include all nodes that are coupled in the plurality of nodes to the node R0, the nodes being ordered in the Cq by a nodeID of each node, where nodeID is an identifier of the node in a topology of the plurality of nodes; and implementing a third loop of the method, comprising:

determining whether the Cq includes a node X, the node X being a first node in the Cq having a node Y in a Previous Hops (PHs) of the node X, the node Y having a degree less than MaxD;

terminating the third loop with the FT not including all the nodes in the plurality of nodes when the Cq does not include the node X;

removing the node X from the Cq and adding the node X to the FT;

determining whether the FT includes all the nodes in the plurality of nodes;

modifying the Cq when the FT does not include all the nodes in the plurality of nodes; and terminating the third loop when the FT includes all the nodes in the plurality of nodes.

22. The method of claim 21, wherein the Cq is initialized with nodes ordered from lowest nodeID to highest nodeID.

23. The method of claim 21, wherein modifying the Cq when the FT does not include all the nodes in the plurality of nodes comprises:

creating a queue of all nodes that are coupled in the plurality of nodes to the node X and are not in the FT, the queue ordered by the nodeID of the nodes in the queue; and for each node Z in the queue:

determining whether the node Z is in the Cq;

adding the node X to the PHs of the node Z in the Cq when the node Z is in the Cq; and appending the node Z to the Cq when the node Z is not in the Cq.

24. The method of claim 23, wherein nodes appended to the Cq are ordered from lowest nodeID to highest nodeID.

25. The method of claim 20, wherein adding the link to any node in the FT having only one link in the FT and coupled in the plurality of nodes to the node having a number of links less than MaxD comprises:

implementing a fourth loop of the method comprising:

determining whether the FT includes a node Q having only one link in the FT;

terminating the fourth loop with all the nodes in the FT having more than one link in the FT when the FT does not include the node Q;

determining whether the FT includes a node L coupled to Q in the plurality of nodes, the node L having (i) a lowest number of links in the FT, (ii) a lowest nodeID when two or more nodes have the same lowest number of links in the FT, and (iii) the degree less than MaxD, when the FT does include the node Q;

when the FT does include the node L:

incrementing by 1 the degree of the node Q in the FT;

incrementing by 1 the degree of the node L in the FT; and adding the node L to the PHs of the node Q in the FT; and terminating the fourth loop without all the nodes in the FT having more than one link in the FT when the FT does not include the node L.

26. The method of claim 20, wherein the node R0 has a lowest nodeID in the plurality of nodes.

* * * * *